(12) United States Patent
Miyamoto et al.

(10) Patent No.: US 9,269,175 B2
(45) Date of Patent: Feb. 23, 2016

(54) GAME APPARATUS AND COMPUTER-READABLE STORAGE MEDIUM HAVING A GAME PROGRAM STORED THEREON

(75) Inventors: Takeshi Miyamoto, Kyoto (JP); Takayuki Shimamura, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 1797 days.

(21) Appl. No.: 12/504,924

(22) Filed: Jul. 17, 2009

(65) Prior Publication Data

US 2010/0292005 A1    Nov. 18, 2010

(30) Foreign Application Priority Data

May 12, 2009    (JP) .................................. 2009-115518

(51) Int. Cl.
*A63F 13/00* (2014.01)
*G06T 13/40* (2011.01)

(52) U.S. Cl.
CPC ......... *G06T 13/40* (2013.01); *A63F 2300/6607* (2013.01)

(58) Field of Classification Search
CPC .. A63F 2300/6607; G06T 13/40; G06T 13/80
USPC ................... 463/36, 37, 1–6, 30–34; 345/473
See application file for complete search history.

(56) References Cited

U.S. PATENT DOCUMENTS

| 6,088,042 | A  | * | 7/2000  | Handelman et al. .......... 345/473 |
| 6,712,692 | B2 | * | 3/2004  | Basson et al. ..................... 463/7 |
| 7,056,216 | B2 | * | 6/2006  | Ohshima ......................... 463/36 |
| 8,243,078 | B2 | * | 8/2012  | Perlin ............................ 345/473 |
| 2004/0017313 | A1 | * | 1/2004  | Menache ...................... 342/465 |
| 2005/0282633 | A1 | * | 12/2005 | Nicolas et al. .................. 463/36 |
| 2008/0261693 | A1 | * | 10/2008 | Zalewski ........................ 463/31 |
| 2009/0048021 | A1 | * | 2/2009  | Lian et al. ....................... 463/37 |
| 2009/0069096 | A1 |   | 3/2009  | Nishimoto |
| 2010/0105475 | A1 | * | 4/2010  | Mikhailov et al. .............. 463/33 |

FOREIGN PATENT DOCUMENTS

JP    2007-102503        4/2007
JP    2009-82696 A       4/2009

* cited by examiner

*Primary Examiner* — Ronald Laneau
*Assistant Examiner* — Ross Williams
(74) *Attorney, Agent, or Firm* — Nixon & Vanderhye P.C.

(57) ABSTRACT

In a game apparatus, a trajectory WP on which a waist W of a player character moves and an elliptic trajectory ArP on which an ankle Par of the player character moves are set. When the player character moves in a game space, the waist moves on the trajectory WP and the ankle moves on the elliptic trajectory ArP in accordance with a movement amount of the player character. In this case, while the ankle makes one round on the elliptic trajectory ArP, the waist makes two shuttle movements on the trajectory WP. Thus, motion images in accordance with the movements of legs and feet are not required to be previously prepared and a variety of motions of the legs and feet of the player character can be realized.

30 Claims, 12 Drawing Sheets

WALKING DIRECTION

F I G. 1 1
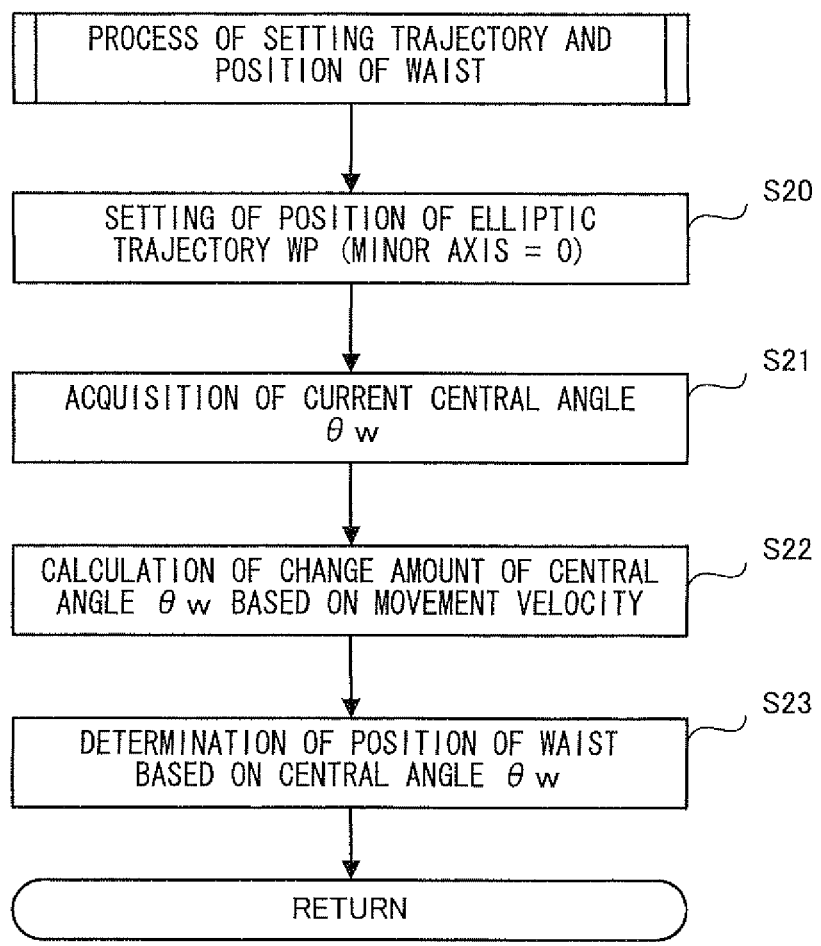

GAME APPARATUS AND COMPUTER-READABLE STORAGE MEDIUM HAVING A GAME PROGRAM STORED THEREON

CROSS REFERENCE TO RELATED APPLICATION

The disclosure of Japanese Patent Application No. 2009-115518, filed on May 12, 2009, is incorporated herein by reference.

BACKGROUND OF THE INVENTION

1. Field of the Invention

The present invention relates to a game apparatus and a computer-readable storage medium having a game program stored thereon and more particularly, to a game apparatus and a computer-readable storage medium having a game program stored thereon, which cause an object to perform a motion by using motion data.

2. Description of the Background Art

Conventionally, there has been a game apparatus which causes an object such as a game character appearing in a virtual 3-dimensional space or the like to perform a motion by using previously stored motion data. For example, Japanese Patent Application Laid-Open Publication No. 2007-102503 (hereinafter, referred to as Patent Document 1) discloses a method in which while a variety of motions of the object are realized by using the motion data, an amount of the motion data is reduced. Specifically, Patent Document 1 discloses a technology in which by blending, in accordance with a position touched on a touch panel, a plurality of pieces of the previously stored motion data pertinent to a player character, a view in which the player character is dribbling a ball is displayed on a screen. This allows the variety of motions of the player character to be displayed even when the amount of the motion data is small.

However, in the technology disclosed in the above-mentioned Patent Document 1, it is required to previously store the plurality of pieces of motion data to be blended. Accordingly, in order to represent complicated motions of the object, an amount of the previously stored motion data increases, thus leading to a disadvantage that a reduction in the amount of the motion data and in a cost required to prepare the motion data is insufficient.

SUMMARY OF THE INVENTION

Therefore, an object of the present invention is to provide a game apparatus and a computer-readable storage medium having a game program stored thereon, which allow a reduction in an amount of motion data and in a cost required to prepare the motion data, while a variety of motions of an object are realized.

The present invention has the following features to achieve the object mentioned above. Note that reference numerals indicated between parentheses, supplementary descriptions, and the like are merely provided in an exemplary manner to facilitate the understanding of the present invention in relation to the later-described embodiment, rather than limiting the present invention in any way.

One embodiment of the present invention is a game apparatus operable to move an object (player character) in a virtual space, comprising: object position setting means (which is a CPU 10 executing S1 and S9) (hereinafter, only step numbers executed by the CPU 10 are simply indicated); first body part setting means (S5 and S6); and display control means (S10). The object position setting means sets a position of the object in the virtual space. The first body part setting means sets a position (position Par or the like) of a first body part (right ankle Ar or the like) of the object as a relative position with respect to the position of the object, which is set by the object position setting means. The display control means displays on a screen an image including the first body part set by the first body part setting means. The first body part setting means sets the position of the first body part by moving the first body part in an amount in accordance with a movement amount of the object on a first trajectory (trajectory ArP or the like) set in accordance with the position of the object.

Note that as the first body part, one body part of the object, which can perform a motion in a manner integrated with the object, is included and the first body part may be one part of a body of the object and may be another object which performs a motion so as to accompany the object.

According to the above-described embodiment, the first trajectory on which the first body part as the one part of the object moves can be set and the position of the first body part can be set on the first trajectory, thereby allowing the first body part to be displayed. Thus, the object can be displayed in various manners, it is not required to previously prepare motion images in accordance with positions of the first body part, and an amount of image data can be reduced.

In the one embodiment of the present invention, the first trajectory may be a closed curve. The first body part setting means sets the position of the first body part on the closed curve.

Here, the closed curve is a curve whose positions of a starting point and an end point coincide with each other and is a curve in a broad concept, which includes a polygon.

According to this configuration, the first body part can be moved on the closed curve.

In the one embodiment of the present invention, the first trajectory may be of an ellipse whose minor axis has a length of greater than or equal to zero or of a circle. The first body part setting means sets a central angle (ear or the like) of the ellipse or circle in accordance with the movement amount of the object and sets a point on the ellipse or circle as the position of the first body part, the point determined based on the central angle.

Here, the ellipse whose minor axis has a length of zero is a line segment having a predetermined length. In addition, the central angle of the ellipse or circle is an angle formed by a line segment spanning from a center of the ellipse or circle to a point on the ellipse or circle and by a predetermined straight line (line segment spanning from the center to a fixed point on the ellipse or circle). In addition, the center of the ellipse is an intersection point of a long axis and a short axis of the ellipse.

According to this configuration, the first body part can be moved on the ellipse or circle based on the central angle. In addition, the central angle is set in accordance with the movement amount of the object, thereby allowing the first body part to be moved in an amount in accordance with the movement amount of the object.

In the one embodiment of the present invention, the first body part setting means may include center position setting means (S20). The center position setting means sets a position of the center of the ellipse or circle center Oar or the like) based on the position of the object.

According to this configuration, the position of the first body part in the virtual space can be set in accordance with the position of the object. Thus, accompanying the movement of the object in the virtual space, the position of the first body part can be moved.

The one embodiment of the present invention may further comprise second body part setting means (S5). The second body part setting means sets a position (position Pw) of a second body part (waist W) of the object as a relative position with respect to the position of the object, which is set by the object position setting means. The second body part setting means sets the position of the second body part by moving the second body part in an amount in accordance with the movement amount of the object on a second trajectory (trajectory WP) set in accordance with the position of the object. The first body part setting means sets the position of the first body part as a relative position with respect to the position of the second body part. The display control means displays on the screen an image including the first body part and the second body part.

According to this configuration, the second trajectory on which the second body part as the one part of the object moves can be set and the position of the second body part can be set on the second trajectory. The position of the first body part can be set as the relative position with respect to the second body part. Thus, the second body part can be moved in accordance with the movement of the object, and accompanying the movement the second body part, the first body part can be moved.

The one embodiment of the present invention may further comprise second body part setting means (S5). The second body part setting means sets a position (position Pw) of a second body part (waist W) of the object as a relative position with respect to the position of the object, which is set by the object position setting means. In addition, the second body part setting means sets the position of the second body part by moving the second body part in an amount in accordance with the movement amount of the object on a second trajectory (trajectory WP) set in accordance with the position of the object. The display control means displays on the screen an image including the first body part and the second body part. And when the object is moving in the virtual space, the first body part and the second body part periodically move on the first trajectory and the second trajectory, respectively and a period of the first body part is double a period of the second body part.

According to this configuration, the first body part and the second body part periodically move on the first trajectory and the second trajectory, respectively. And the period of the first body part is set to be double the period of the second body part, whereby the first body part can be caused to perform a motion so as to be associated with a motion of the second body part.

The one embodiment of the present invention may further comprise third body part setting means (S6). The third body part setting means sets a position of a third body part (left ankle Al) of the object as a relative position with respect to the position of the object, which is set by the object position setting means. In addition, the third body part setting means sets the position of the third body part by moving the third body part in an amount in accordance with the movement amount of the object on a third trajectory (trajectory AlP) set in accordance with the position of the object. The third body part setting means further sets the position of the third body part as a relative position with respect to the position of the second body part. The display control means displays on the screen an image including the first body part, the second body part, and the third body part. And when the object is moving in the virtual space, the third body part moves on the third trajectory in a period same as the period of the first body part, and there is a predetermined difference between a phase of the first body part and a phase of the third body part.

According to this configuration, in addition to the positions of the first body part and the second body part, the position of the third body part can be set, thereby allowing the first body part, the second body part, and the third body part to be displayed on the screen. In addition, the first body part and the third body part are moved with the predetermined difference between the phases thereof, whereby a view in which the first body part and the third body part perform the motions so as to be associated with each other can be displayed on the screen and for example, a view in which a person is walking and running can be displayed.

In the one embodiment of the present invention, the second trajectory may be of an ellipse whose minor axis has a length of greater than or equal to zero or of a circle. In this case, the second body part setting means sets a central angle of the ellipse or circle in accordance with the movement amount of the object and sets a point on the ellipse or circle as the position of the second body part, the point determined based on the central angle.

According to this configuration, the second body part can be moved on the ellipse or circle based on the central angle. In addition, the central angle is set in accordance with the movement amount of the object, whereby the second body part can be moved in the amount in accordance with the movement amount of the object.

In the one embodiment of the present invention, the object may move on a predetermined terrain object present in the virtual space. In this case, the first body part setting means includes determination means (S36) and position correction means (S39). The determination means determines whether or not the first body part is present inside the terrain object. When the determination means determines that the first body part is present inside the terrain object, the position correction means corrects the position of the first body part to be on a surface of the terrain object.

According to this configuration, when the first body part is present inside the terrain object, the position of the first body part can be corrected, whereby the first body part can be prevented from being displayed below the ground.

In the one embodiment of the present invention, the object may move on a predetermined terrain object present in the virtual space. In this case, when the movement amount of the object per unit time is smaller than a predetermined threshold value, the first body part setting means further sets the position of the first body part such that the position of the first body part is caused to approach the terrain object (S52).

According to this configuration, when the object is moving on the terrain object and a speed at which the object is moving on the terrain object is lower than a predetermined speed, the position of the first body part can be caused to approach the terrain object. Thus, even when the object is moving at a low velocity, a display of the first body part can be made natural.

In the one embodiment of the present invention, the object may be a person object, the first body part and the third body part may be ankles, and the second body part may be a waist.

According to this configuration, motions of legs and feet of the person object can be represented.

The one embodiment of the present invention may further comprise knee state setting means (S7) for setting a knee state (an angle of a knee and a direction of the knee) based on the position of the ankle, which is set by the first body part setting means and on the position of the waist, which is set by the second body part setting means.

According to this configuration, the angle and the direction of the knees can be set and natural motions of the legs can be realized.

In the one embodiment of the present invention, the object position setting means may set the position of the object in the virtual space based on a predetermined operation input.

According to this configuration, based on the operation input from a player, the position of the object can be set.

Another embodiment of the present invention is a game apparatus operable to move an object in a virtual space, comprising: object position setting means; first body part motion means; and display control means. The object position setting means sets a position of the object in the virtual space. The first body part motion means causes a first body part of the object to perform a motion as a relative motion with respect to the position of the object, which is set by the object position setting means. The display control means displays on a screen an image including the first body part caused to perform the motion by the first body part motion means. And the first body part motion means causes the first body part to perform the motion by moving the first body part within a predetermined time period on a first trajectory set in accordance with the position of the object.

According to this configuration, the first trajectory on which the first body part as one part of the object moves can be set and the first body part can be caused to perform the motion on the first trajectory. Thus, the object can be displayed in various manners, it is not required to previously prepare motion images in accordance with positions of the first body part, and an amount of image data can be reduced.

In addition, each of the game apparatuses according to the one and another embodiments of the present invention may be embodied in a form of a game program which causes the computer in each of the game apparatuses to function as the above-described respective means.

According to the present invention, the trajectory on which the one body part of the object moves is set and the body part moves on the trajectory, thereby allowing the object to be displayed in the various manners. Thus, it is not required to previously prepare the motion images in accordance with the positions of the body parts of the object, and an amount of image data and a cost required to prepare the image data can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flow chart showing details of a process (step S5) of setting a trajectory and a position of a waist, shown in FIG. 10;

DESCRIPTION OF THE PREFERRED EMBODIMENTS

[Entire Configuration of Game System]

Figure 1:
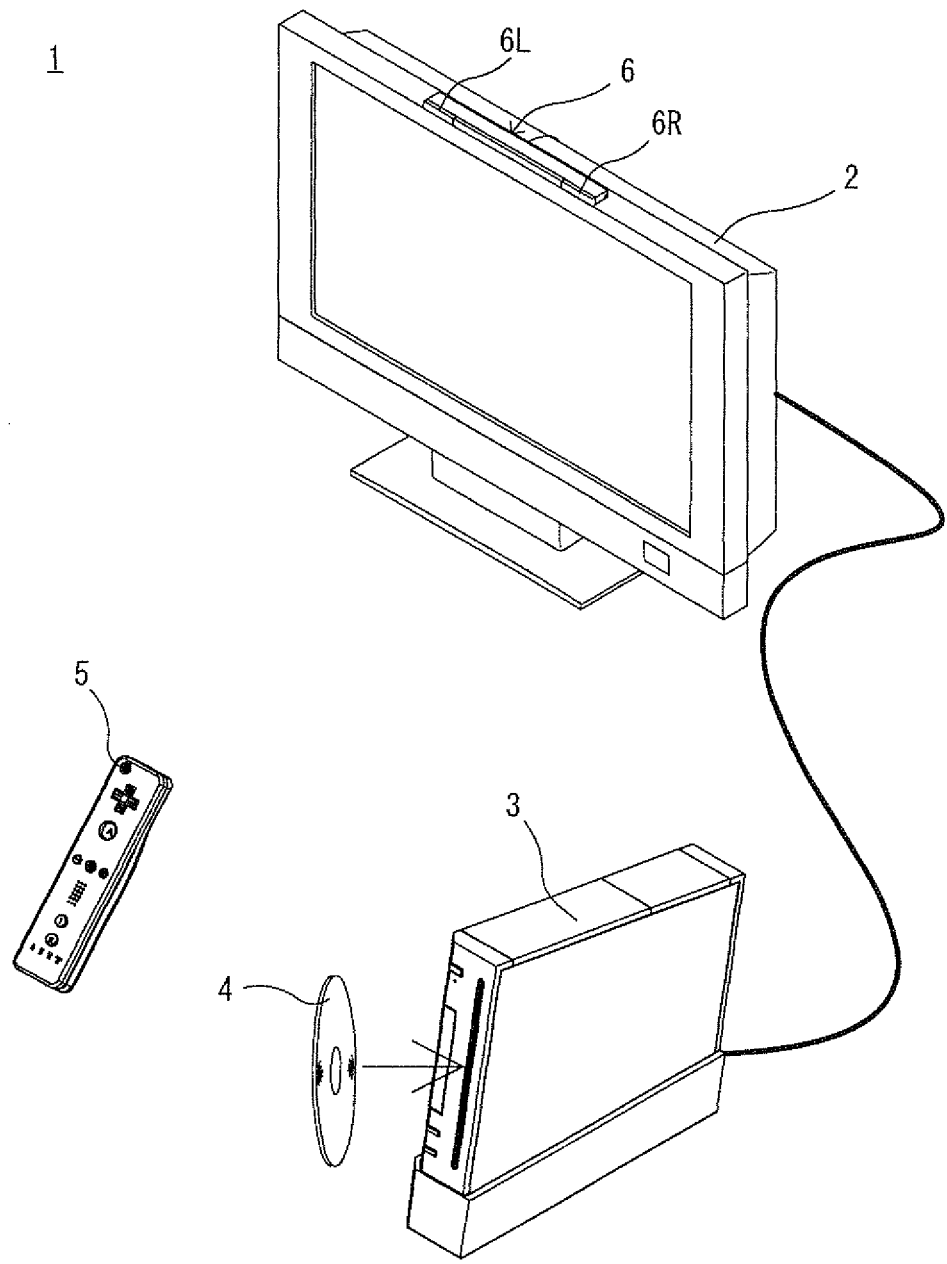
FIG. 1 is a diagram illustrating an external view of a game system 1.

With reference to FIG. 1, a game system 1 including a game apparatus according to one embodiment of the present invention will be described. FIG. 1 is an external view of the game system 1. Hereinafter, with a stationary game apparatus taken as one example, the game apparatus and a game program of the present embodiment will be described. As shown in FIG. 1, the game system 1 includes a television receiver 2 (hereinafter, simply referred to as a "television 2"), the game apparatus 3, an optical disc 4, a controller 5, and a marker section 6. In this system, the game apparatus 3 performs game processing based on game operations using the controller 5.

In the game apparatus 3, the optical disc 4 as one example of an information storage medium used for the game apparatus 3 in an exchangeable manner is detachably inserted. The game program executed in the game apparatus 3 is stored in the optical disc 4. The game apparatus 3 has, on a front surface thereof, an insertion opening for the optical disc 4. The game apparatus 3 reads and executes the game program stored in the optical disc 4 which is inserted into the insertion opening, thereby performing the game processing.

The game apparatus 3 is connected to the television 2, which is one example of a display device, via a connecting cord. A game image obtained as a result of the game processing executed in the game apparatus 3 is displayed on the television 2. Further, the marker section 6 is provided on a periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs and emits infrared light forward from the television 2. The marker section 6 is connected to the game apparatus 3, and the game apparatus 3 is able to control the infrared LEDs of the marker section 6 to light up.

The controller 5 is an input device for providing the game apparatus 3 with operation data indicating a content of an operation performed on the controller 5 itself. The controller and the game apparatus 3 are connected through wireless communications. In the present embodiment, a technology of, for example, the Bluetooth (Registered Trademark) is used in the wireless communications between the controller 5 and the game apparatus 3. In another embodiment, the controller 5 and the game apparatus 3 may be connected through wire communications.

Figure 3:
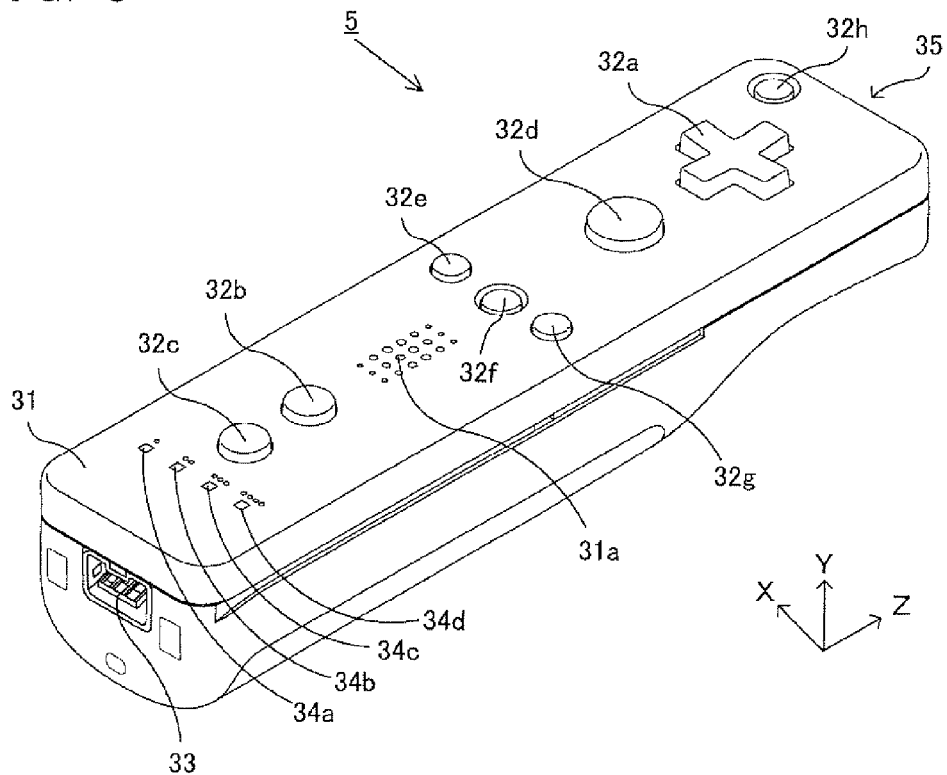
FIG. 3 is a perspective view in which a controller 5 is viewed from a top rear side thereof.
Figure 4:
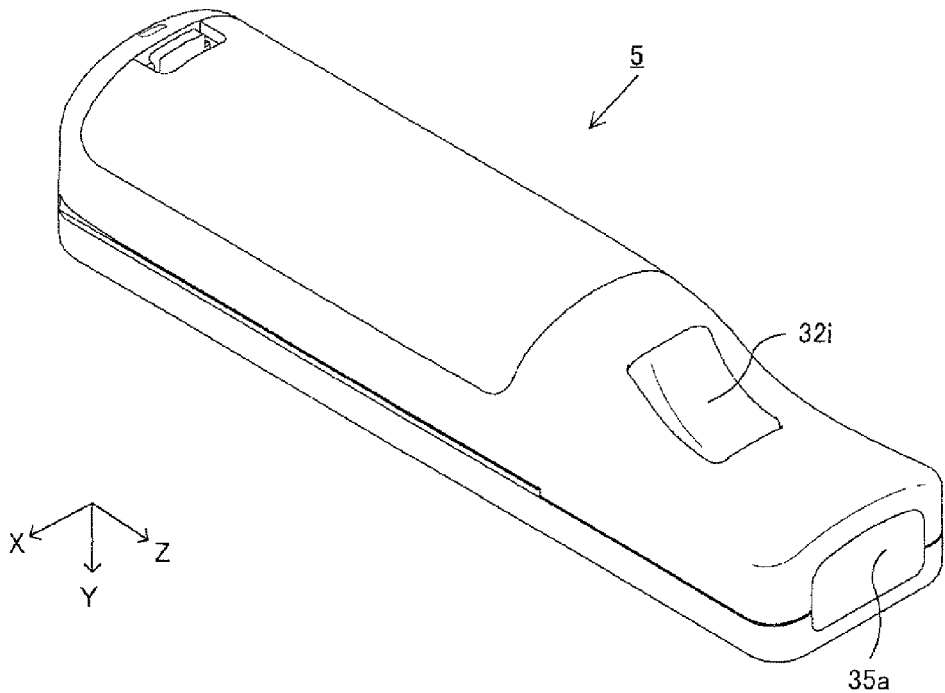
FIG. 4 is a perspective view in which the controller 5 is viewed from a bottom front side thereof.

FIG. 3 is a perspective view in which the controller 5 is viewed from a top rear side thereof. FIG. 4 is a perspective view in which the controller 5 is viewed from a bottom front side. The controller 5 has a housing 31 formed by, for example, plastic molding. The housing 31 has a substantially parallelepiped shape extending in a longitudinal direction from front to rear (2-axis direction shown in FIG. 3), and the entire housing 31 has such a size as to be able to be held by one hand of an adult or even a child. A player is allowed to perform game operations by pressing buttons provided on the controller 5 and moving the controller 5 so as to change the position and the orientation thereof.

The housing 31 is provided with a plurality of operation buttons. As shown in FIG. 3, on a top surface of the housing 31, a cross button 32a, a first button 32b, a second button 32c, an A button 32d, a minus button 32e, a home button 32f, a plus button 32g, and a power button 32h are provided. In the specification of the present invention, the top surface of the housing 31 on which the buttons 32a to 32h are provided may be referred to as a "button surface". On the other hand, as shown in FIG. 4, a recessed portion is formed on a bottom surface of the housing 31, and a B button 32i is provided on a rear slope surface of the recessed portion. The operation buttons 32a to 32i are assigned, as necessary, with respective functions in accordance with the game program executed by the game apparatus 3. Further, the power button 32h remote-controls the power of a main body of the game apparatus 3 to be on and off. Top surfaces of the home button 32f and the power button 32h are buried in the top surface of the housing 31, thereby preventing the home button 32f and the power button 32h from being inadvertently pressed by the player. Between the first button 32b and the home button 32f on the top surface of the housing 31, sound holes for outputting sounds from a speaker integrated in the controller 5 to the outside are formed.

On a rear surface of the housing 31, a connector 33 is provided and used for connecting the controller 5 to another device. In the rear portion on the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used, for example, for the purpose of informing a player of the controller type which is currently set on the controller 5 that he or she is using and for the purpose of informing a player of remaining battery power of the controller 5. Specifically, when a game operation is performed by using the controller 5, one of the plurality of LEDs 34a, 34b, 34c, and 34d, which corresponds to the above-mentioned controller type, is lit up.

In addition, the controller 5 has an imaging information calculation section 35 and as shown in FIG. 4, a light incident surface 35a through which light is incident on the imaging information calculation section 35 is provided on the front surface of the housing 31. The light incident surface 35a is made of a material allowing at least infrared light outputted from the markers 6R and 6l, to pass through.

[Internal Structure of Game Apparatus]

Figure 2:
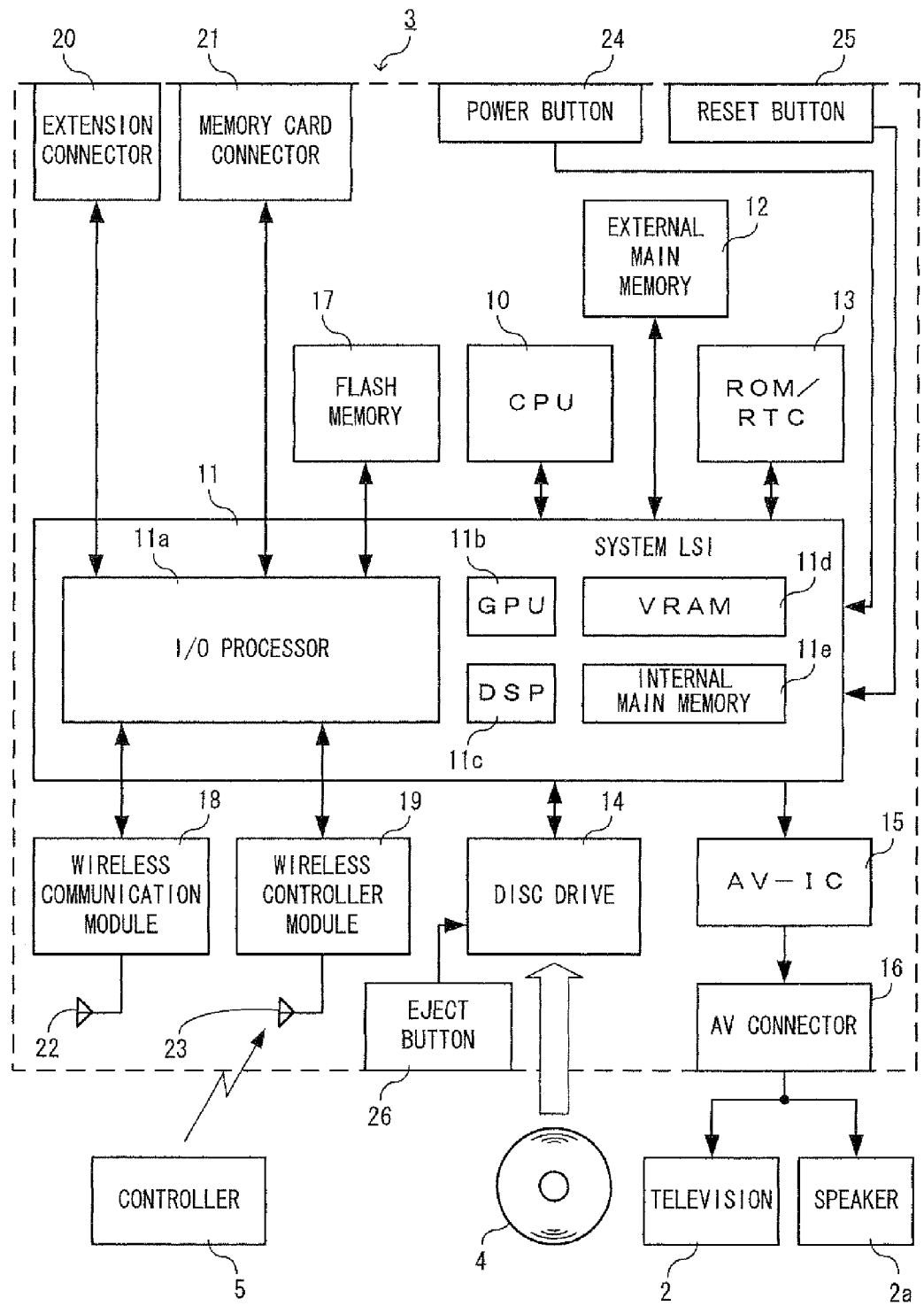
FIG. 2 is a block diagram illustrating a configuration of a game apparatus 3.

Next, with reference to FIG. 2, an internal structure of the game apparatus 3 will be described. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs the game processing by executing the game program stored in the optical disc 4. The CPU 10 is connected to the system LSI 11. Connected to the system LSI 11 in addition to the CPU 10 are the external main memory 12, the ROM/RTC 13, the disk drive 14, and the AV-IC 15. The system LSI 11 performs processing for controlling data transmission between the respective components connected thereto, generating an image to be displayed, acquiring data from an external device, and the like. An internal structure of the system LSI will be described below. The external main memory 12 which is volatile stores a program such as a game program read from the optical disc 4 and a game program read from a flash memory 17, and various data, and the external main memory 12 is used as a work area and a buffer area for the CPU 10. The ROM/RTC 13 includes: a ROM (so-called a boot ROM) having incorporated thereinto a boot program for booting up the game apparatus 3; and a clock circuit (RTC: Real Time Clock) for counting a time. The disk drive 14 reads program data, texture data, and the like from the optical disk 4 and writes the read data into an internal main memory 1ie or the external main memory 12 described below.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPO 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPO 11b generates image data by using data stored in the VRAM 11d.

The DSP 11c, functioning as an audio processor, generates audio data by using sound data and sound waveform (tone quality) data stored in the internal main memory 11e or the external main memory 12.

The image data and the audio data generated as described above are read by the AV-IC 15. The AV-IC 15 outputs the read image data to the television 2 via an AV connector 16 and outputs the read audio data to a speaker 2a incorporated in the television 2. Thus, an image is displayed on the television 2, and a sound is outputted from the speaker 2a.

The input/output processor 11a performs data transmission to and data reception from the components connected thereto and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22 so as to allow communications with another game apparatus and various servers connected to the network. The input/output processor 11a regularly accesses the flash memory 17, detects presence and absence of data which needs to be transmitted to the network, and transmits, when the presence of the data is detected, the data to the network via the wireless communication module 18 and the antenna 22. Further, the input/output processor 11a receives data transmitted from another game apparatus and/or download data from a download server, via the network, the antenna 22, and the wireless communication module 18 and stores the received data and/or the downloaded data in the flash memory 17. The CPU 10 executes the game program so as to read data stored in the flash memory 17 and use the data in the game program. In addition to the data transmitted from the game apparatus 3 to another game apparatus or the various servers and the data received by the game apparatus 3 from another game apparatus or the various servers, the flash memory 17 may store saved data (game result data or intermediate step data) of a game played by using the game apparatus 3.

The input/output processor 11a receives operation data transmitted from the controller 5 via the antenna 23 and the wireless controller module 19 and (temporarily) stores the received operation data in a buffer area of the internal main memory 11e or the external main memory 12.

Further, the input/output processor 11a is connected to the extension connector 20 and the memory card connector 21. The extension connector 20 is a connector for interface, such as a USB or a SCSI, and allows communications with the network by connecting thereto a media such as an external storage medium, connecting thereto a peripheral device such as another controller, and connecting thereto a wired communication connector, instead of using the wireless communication module 18. The memory card connector 21 is a connector for connecting thereto an external storage medium such as a memory card. For example, the input/output processor 11e is able to access an external storage media via the extension connector 20 or the memory card connector 21 and to store data in the external storage media or to read data from the external storage media.

The game apparatus 3 includes a power button 24, a reset button 25, and an eject button 26. The power button 24 and the reset button 25 are connected to the system LSI 11. When the power button 24 is turned on, power is supplied to the respective components of the game apparatus 3 through an AC adaptor not shown. When the reset button 25 is pressed, the system LSI 11 reboots the boot program of the game apparatus 3. The eject button 26 is connected to the disk drive 14. When the eject button 26 is pressed, the optical disc 4 is ejected from the disk drive 14.

[Outline of Game Processing]

Next, with reference to FIG. 5 through FIG. 8B, an outline of game processing of the present embodiment will be described. In the present embodiment, when a game character such as a player character appearing in a 3-dimensional game space moves in the game space, motions of legs and feet of the moving game character are displayed in a realistic manner on a screen. Specifically, as a game in the present embodiment, a game of basketball is played by characters of a player's team and characters of an opposing team. In accordance with inputs performed by the player on the controller 5, a game character walks and runs on a basketball court. In general, when a game character walks in a game space, a view in which the game character walks in the game space is displayed on a screen by sequentially displaying images of a plurality of motions, which have been previously stored. In the present embodiment, an amount of previously stored motion data is reduced by obtaining the motions of feet of the game character through calculation. In the present embodiment, a trajectory on which an ankle of the game character moves and a trajectory on which a waist of the game character moves are determined. By causing the ankle and the waist to move on the trajectories, positions of the ankle and the waist are moved and a view in which the game character performs a motion of walking or the like is displayed on the screen.

Figure 5:
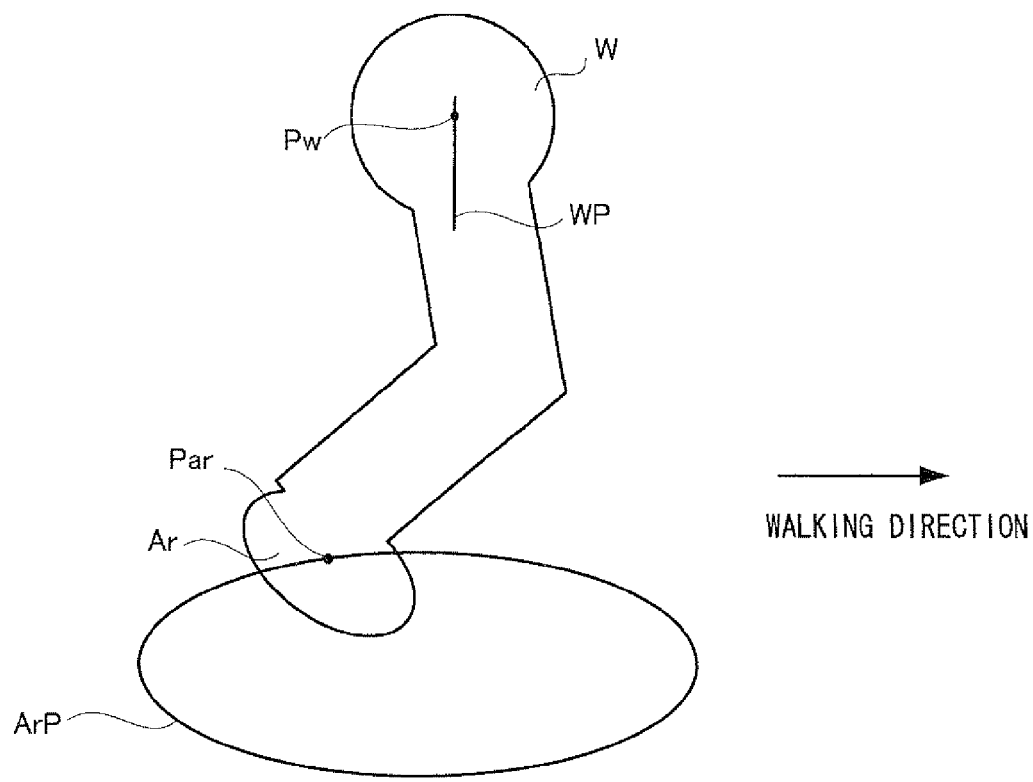
FIG. 5 is a diagram illustrating a lateral view in which an ankle and a waist of a game character move.

FIG. 5 is a diagram illustrating a lateral view in which the ankle and the waist of the game character move. In FIG. 5, only a body part lower than the waist of the game character in the lateral view in which the game character moves in the game space is shown. In FIG. 5, a waist W of the game character and a right ankle Ar of the game character, which are body parts thereof, are shown. In addition, a trajectory WP of the waist W and a trajectory ArP of the right ankle Ar are shown. Each of the body parts moves on each of the trajectories which have been respectively set. In other words, the waist W moves on the trajectory WP and the right ankle Ar moves on the trajectory ArP. More specifically, a position Pw indicating a position of the waist W moves on the trajectory WP, whereby the waist W moves, and a position Par indicating a position of the right ankle Ar moves on the trajectory ArP, whereby the right ankle Ar moves. In addition, though not shown, a left ankle Al also moves on a trajectory AlP which has been set for the left ankle Al, in a manner similar to the right ankle Ar. As described above, the body parts respectively moves on the trajectories which have been set for the body parts the waist W, the right ankle Ar, and the left ankle Al), whereby the view in which the game character performs a motion as a whole is displayed on the screen.

Figure 6:
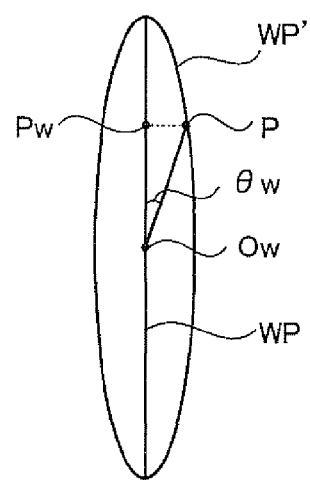
FIG. 6 is a diagram illustrating a manner in which the waist W moves.

Next, a manner in which each of the body parts moves on each of the trajectories will be described. Each of the body parts moves to a position on an elliptic trajectory, which corresponds to a central angle which has been set for each of the body parts and is used as a parameter. The central angle set for the each of the body parts changes in accordance with a velocity (in reality, a movement amount which is a product of a velocity and a time period) at which the game character moves in the game space. FIG. 6 is a diagram illustrating a manner in which the waist W moves. As shown in FIG. 6, although the trajectory WP of the waist W is a straight line in reality, the trajectory WP can be deemed as an ellipse whose minor axis has a length of zero (a length of a short axis of the ellipse). In FIG. 6, an ellipse WP' is drawn to facilitate understanding of the description. A position Pw of the waist W changes in accordance with a magnitude of a central angle Sw (an angle formed by a line segment spanning from a point on the ellipse WP' to a center Ow of the ellipse WP' and by a long axis of the ellipse WP') of the ellipse WP'. In other words, as shown in FIG. 6, the position Pw of the waist W is a foot of a perpendicular drawn from a point P on the ellipse WP', which corresponds to the central angle θw, onto the trajectory WP which is the straight line (elliptic trajectory WP whose minor axis is zero). Accordingly, when the game character moves at a constant velocity, by changing the above-mentioned central angle Sw at a constant velocity, the position Pw of the waist W also changes in accordance with the movement of the game character, and as a result, the waist W moves.

Figure 7:
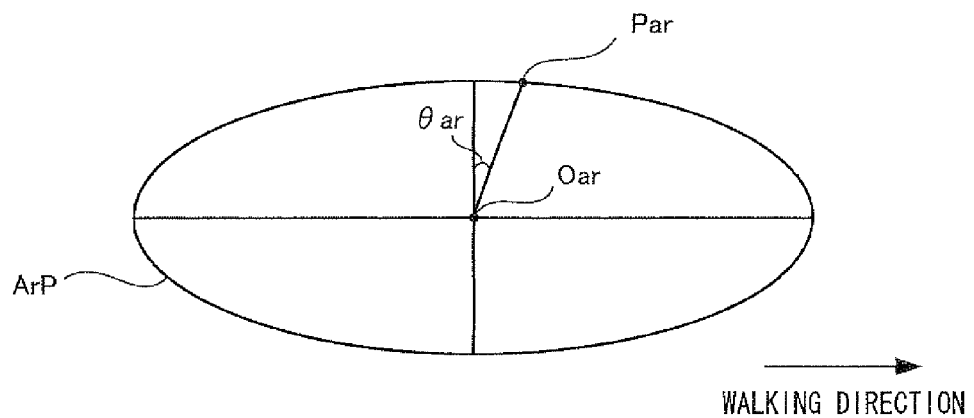
FIG. 7 is a diagram illustrating a manner in which a right ankle Ar moves.

Similarly, by changing a central angle of the trajectory ArP, the right ankle Ar can be moved on the trajectory ArP. FIG. 7 is a diagram illustrating a manner in which the right ankle Ar moves. As shown in FIG. 7, a position Par of the right ankle Ar is determined in accordance with a value of a central angle θar of an elliptic trajectory ArP. The central angle θar changes in accordance with a movement amount of the game character in the game space. In addition, though not shown, as similarly to the right ankle Ar, a position Pal of the left ankle Al is determined in accordance with a central angle θal of an elliptic trajectory AlP which has been set for the left ankle Al.

As described above, each of the body parts moves on each of the elliptic trajectories (among which the ellipse whose minor axis has the length of zero is included) which have been set respectively therefor. The position of each of the body parts changes in accordance with a central angle respectively set therefor as a parameter. Here, a change amount of the central angle θw of the waist W in accordance with the movement of the game character is set to be double a change amount of each of the central angles of the right and left ankles. In other words, a period (a period of each of the right and left ankles) in which each of the right and left ankles moves on each of the elliptic trajectories is set to be double a period (a period of the waist) in which the waist W moves on the elliptic trajectory WP (a period in which the right ankle moves and a period in which the left ankle moves are set to be the same). For example, while the right ankle Ar rotates a half-turn on the trajectory ArP (while a central angle θar changes from 0 to π), the waist W moves from a topmost point of the trajectory WP through a bottommost point of the trajectory WP to the topmost point of the trajectory WP (that is, the waist W rotates one turn on the trajectory WP). Similarly, while the left ankle Al rotates a half-turn, the waist W moves from the topmost point of the trajectory WP through the bottommost point of the trajectory WP to the topmost point of the trajectory WP.

Figure 8A:
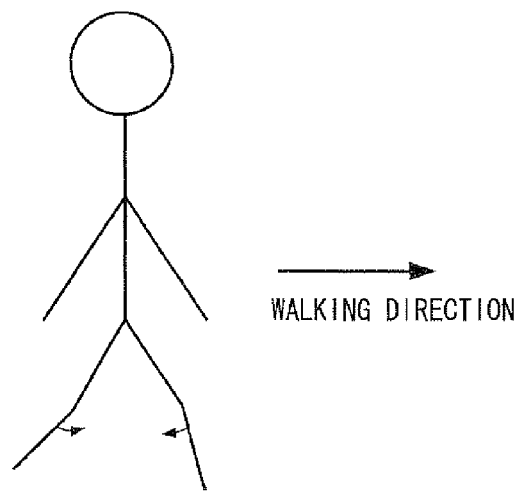
FIG. 8A is a diagram illustrating a view in which when a person who is walking is viewed from a lateral side, his or her right or left leg is located back or forth in a traveling direction.
Figure 8B:
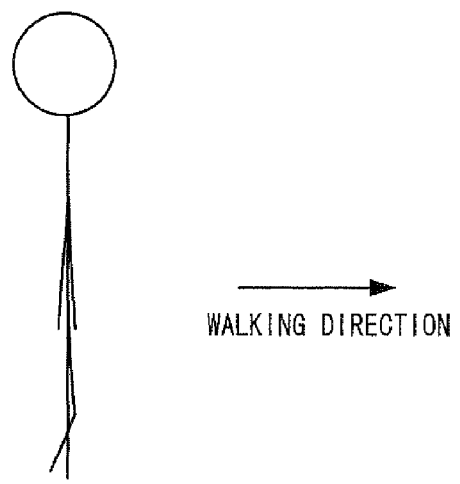
FIG. 8B is a diagram illustrating a view in which when the person which is walking is viewed from the lateral side, his or her right or left foot is touching the ground and his or her knee is straightened.

FIG. 8A is a diagram illustrating a view in which when a person who is walking is viewed from a lateral side, his or her right or left leg is located back or forth in a traveling direction. FIG. 8B is a diagram illustrating a view in which when the person which is walking is viewed from the lateral side, his or her right or left foot is touching the ground and his or her knee is straightened. When a person walks and runs, it is considered that for example, when his or her right or left leg is straightened (as shown in FIG. 86, when his or her right or left foot is substantially perpendicular to his or her body), the waist is located at the topmost point, and when his or her right or left leg is bent (as shown in FIG. 8A, when his or her right or left foot is located back or forth in the traveling direction), the waist is located at the bottommost point. Accordingly, for example, while his or her right foot performs one shuttle movement back and forth in the traveling direction, the waist performs two shuttle movements up and down. As described above, the period in which the ankle moves is set to be double the period in which the waist moves, whereby a view in which a motion of the legs and feet and a motion of the waist are performed so as to be associated with each other and to be seen as if a person was walking or running can be displayed in a realistic manner.

In addition, phases of the right ankle Ar and the left ankle Al are set to be opposite to each other. In other words, the phase of the right ankle Ar is displaced by π from the phase of the left ankle Al. As described above, the phases of the right ankle Ar and the left ankle Al are displaced from each other, whereby a motion in which the right and left legs and feet moves alternately back and forth can be represented.

As described above, the period in which each of the ankles moves is set to be double the period in which the waist moves, and the phases of the right and left ankles are set to be opposite to each other, whereby the motion in which the game character walks and runs in the game space can be represented in the realistic manner so as to be seen as if a person was walking and running.

[Details of Game Processing]

Figure 9:
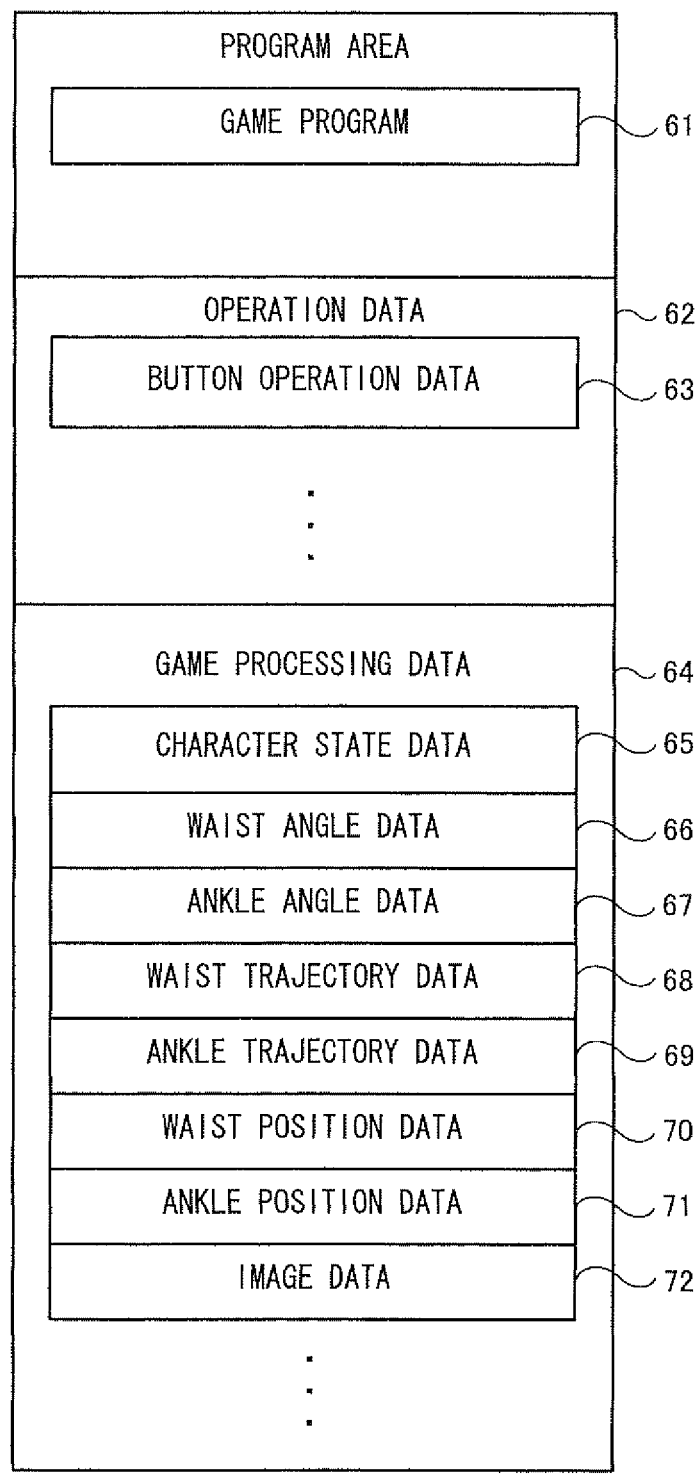
FIG. 9 is a diagram showing main data stored in a main memory of the game apparatus 3.

Next, with reference to FIG. 9 through FIG. 16, details of processing executed in the game apparatus 3 will be described. First, main data used in the processing executed in the game apparatus 3 will be described with reference to FIG. 9. FIG. 9 is a diagram showing the main data stored in the main memory (the external main memory 12 or the internal main memory 11e) of the game apparatus 3. As shown in FIG. 9, a game program 61, operation data 62, and game processing data 64 are stored in the main memory of the game apparatus 3.

At appropriate timing after the game apparatus 3 is powered on, a part or all of the game program 61 is loaded from the optical disc 4 and stored in a program area of the main memory.

The operation data 62 is sent from the controller 5 to the game apparatus 3. The operation data 62 is sent from the controller 5 to the game apparatus 3, for example, at a rate of one time per 1/200 seconds, and therefore, the operation data 62 stored in the main memory is updated at this rate. In the operation data 62, button operation data 63, which indicates whether or not each of the buttons (for example, the cross button 32a) is pressed, or the like is included.

Figure 10:
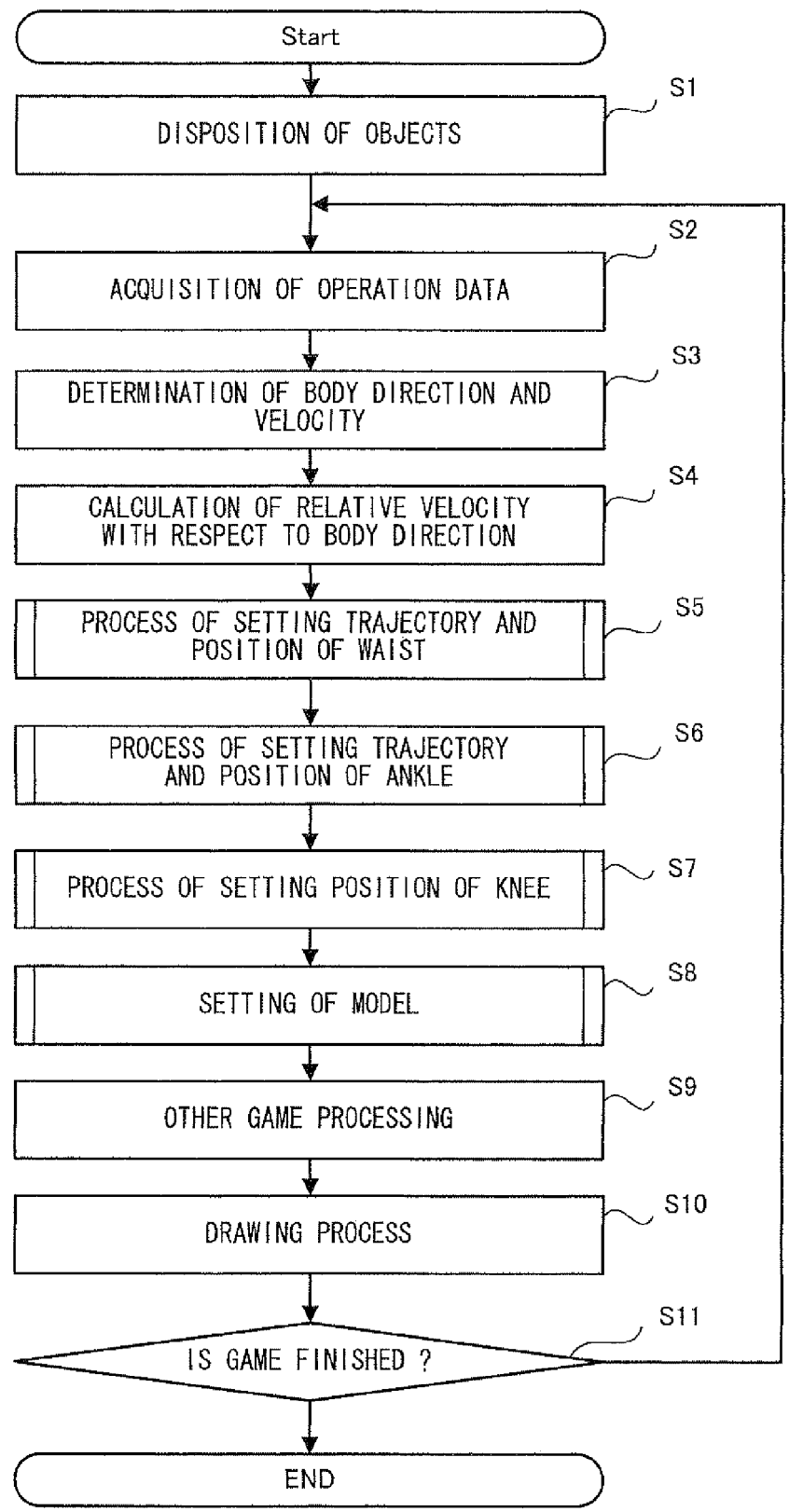
FIG. 10 is a main flow chart showing a flow of game processing executed in the game apparatus 3.

The game processing data 64 is used in the later-described game processing (FIG. 10). In the game processing data 64, character state data 65, waist angle data 66, ankle angle data 67, waist trajectory data 68, ankle trajectory data 69, waist position data 70, ankle position data 71, and image data 72 are included. In addition to the above-mentioned pieces of data, data needed for the game processing, such as data indicating a position of an opponent character and a position of a ball, data pertinent to the game space such as the ground (a court) and a goal, and data pertinent to a game state, are included.

The character state data 65 indicates a position of a player character, a direction of a body of the player character, and a velocity of the player character in the game space. The waist angle data 66 indicates a position of the waist on the above-described trajectory WP of the waist and indicates the above-mentioned central angle θw. The ankle angle data 67 indicates positions of the respective ankles on the above-described trajectories of the respective ankles (the elliptic trajectory ArP and the elliptic trajectory AlP) and indicates the above-mentioned central angle θar and central angle θal.

The waist trajectory data 68 is pertinent to the trajectory WP of the waist and indicates a position of the trajectory WP of the waist in the game space (a position of the center Ow of the trajectory WP), lengths of a short axis and a long axis of the trajectory WP, an inclination of the short axis or the long axis (an inclination of the short axis or the long axis with respect to a fixed coordinate axis in the game space), and the like. The ankle trajectory data 69 is pertinent to the trajectories of the respective ankles (the elliptic trajectory ArP and the elliptic trajectory AlP) and indicates positions of the trajectories of the respective ankles (positions of the center Oar and the center Oal of the trajectories), lengths of a short axis and a long axis of each of the trajectories, an inclination of the short axis or the long axis of each of the trajectories (an inclination of the short axis or the long axis of each of the trajectories with respect to the fixed coordinate axis in the game space), and the like.

The waist position data 70 indicates a position Pw of the waist in the game space. The ankle position data 71 indicates positions of the ankles in the game space (the position Par of the right ankle and the position Pal of the left ankle).

The image data 72 is pertinent to images of the player characters and various objects. As the image data of the player character, for example, an image in which the player character takes a basic posture (a posture taken by the player character in an upright state) is stored in the main memory. Although the image of the player character is stored as, for example, a 3-dimensional model, the image of the player character may be stored as a form other than the 3-dimensional model. Here, the basic posture may be the 3-dimensional model itself of the player character taking in the posture, and the data of the basic posture may be control data which indicates a posture taken with respect to the 3-dimensional model separately stored.

FIG. 10 is a main flow chart showing a flow of the game processing executed in the game apparatus 3. When the game apparatus 3 is powered on, the CPU 10 in the game apparatus 3 executes a boot program stored in a boot ROM not shown, thereby initializing the respective units such as the main memory. The game program, the images (the image data 72) of the various objects (game characters, a ball, the ground, etc.), and the like stored in the optical disc 4 are loaded to the main memory, and the CPU 10 starts executing the game program. The flow chart shown in FIG. 10 shows the processing performed after the above-mentioned processes have been completed. Note that descriptions of game processes which do not directly relate to the present invention will be omitted and with reference to FIG. 10, only the processing of the above-described motions of legs and feet of the game character will be mainly described.

First, at step S1, the CPU 10 disposes the various objects in the game space. Specifically, the CPU 10 disposes in the game space the player characters which are controlled by a player, a terrain object representing a terrain (ground), and the like, and stores positions of the player characters and the like as the character state data 65 or the like in the main memory. Next, the CPU 10 executes a process at step S2.

At step S2, the CPU 10 acquires, from the controller 5, operation data inputted by the player. Specifically, the CPU 10 acquires from the main memory the button operation data 63 stored in the main memory. Next, the CPU 10 executes a process at step S3.

At step S3, the CPU 10 determines a direction of a body and a velocity of the player character. Specifically, the CPU 10 determines the direction of the body of the player character and the velocity (a direction and a speed) at which the player character moves, based on the button operation data 63 acquired at step S2. Here, it is not necessarily required to cause the direction of the body of the player character to coincide with a direction in which the player character moves. For example, the direction of the body of the player character is set such that the body of the player character faces toward a predetermined position in the game space (for example, a position where the ball is present). In addition, for example, in a case where the cross button 32a of the controller 5 is pressed by the player, the CPU 10 determines a direction indicated by the cross button 32a (for example, a right direction determined when a right button of the cross button 32a is pressed) as the direction in which the player character moves. Further, for example, the speed at which the player character moves is determined to be a predetermined speed which has been previously determined. The direction of the body of the player character is determined. The CPU 10 stores in the main memory the direction of the body and the velocity of the player character as the character state data 65. Note that the velocity at which the player character moves and the direction of the body of the player character may be determined in any manner. For example, in accordance with whether or not the A button 32d or the B button 32i is pressed, the velocity (the direction and the speed) may be determined. In accordance with an operation on the controller 5 by the player, the direction of the body may be set. In addition, an extended controller further including a stick or the like may be connected to the connector 33 of the controller 5 and based on an operation using the stick, the determination may be made. In addition to the above-described determination, in the game processing, the velocity at which the player character moves and the direction of the body of the player character may be set in any manner. Next, the CPU 10 executes a process at step S4.

At step S4, the CPU 10 calculates a relative velocity with respect to the direction of the body of the player character. Specifically, based on the velocity at which the player character moves and the direction of the body of the player character, which have been determined at step S3, the CPU 10 calculates the relative velocity of the direction of the body (a velocity component of the "direction of the body"). Next, the CPU 10 executes a process at step S5.

At step S5, the CPU 10 sets a trajectory and a position of the waist. In the process performed here, a position of the trajectory WP of the waist W in the game space and a position Pw of the waist on the trajectory WP, which are described above, are set. Details of the process at step S5 will be described with reference to FIG. 11. FIG. 11 is a flow chart showing the details of the process (step S5) of setting the trajectory and the position of the waist, shown in FIG. 10.

First, the CPU 10 executes a process at step S20. At step S20, the CPU 10 sets a position of the elliptic trajectory WP of the waist in the game space. Here, the trajectory WP is an ellipse whose minor axis has a length of zero and is a line segment having a predetermined length (a length of a long axis of the ellipse) in reality. In addition, the position of the elliptic trajectory WE (a position of the trajectory WP) in the game space is a position of the center Ow of the trajectory WP in the game space. At step S20, based on a current position of the trajectory WE in the game space and a velocity at which the player character moves, the CPU 10 sets a position of the center Ow of the trajectory WE. Specifically, when the player character is moving, the CPU 10 changes a position of a current trajectory WE (a position of the center Ow of the trajectory WP previously set when the process at step S20 is executed) in accordance with the velocity at which the player character moves. And the CPU 10 stores in the main memory the position of the trajectory WP as the waist trajectory data 68. Note that at step S20, in addition to the position of the trajectory WP, a direction of the trajectory WP may also be set. The direction of the trajectory WP is a direction of a short axis in the game space in a case where a length of a minor axis of the trajectory WP is not zero. As described above, the direction of the trajectory WP is set and thereby, the direction of the waist of the player character is set. In addition, in the present embodiment, although the direction of the long axis of the trajectory WP is set in a vertical direction (a top-to-bottom direction) in the game space, the direction of the long axis may also be set in accordance with a game state (the velocity of the player character, a surrounding environment, an operation state, etc.) (in this case, the waist W moves with a predetermined inclination with respect to the top-to-bottom direction). Next, the CPU 10 executes a process at step S21.

At step S21, the CPU 10 acquires a current central angle θw of the waist. Specifically, referring to the main memory, the CPU 10 acquires the central angle θw of the waist, which has been calculated last time at step S23 (described later). Next, the CPU 10 executes a process at step S22.

At step S22, based on a velocity at which the player character moves, the CPU 10 calculates a change amount of the central angle θw. Specifically, in accordance with a movement amount obtained by multiplying by a unit time (a time period of one frame) the velocity, determined at step S3, at which the player character moves, the CPU 10 calculates the change amount of the central angle θw. An angular velocity of the central angle θw and the movement velocity of the player character are associated with each other. In other words, when the movement velocity of the player character is large, because the legs and feet and the waist of the player character quickly move, the change amount of the central angle θw is large. Next, the CPU 10 executes a process at step S23.

At step S23, based on the central angle θw, the CPU 10 determines a position Pw of the waist. Specifically, by adding the change amount of the central angle θw, which has been calculated at step S22, to the current central angle θw of the waist, which has been acquired at step S21, the CPU 10 calculates a new central angle θw of the waist and stores in the main memory the new central angle θw of the waist as the waist angle data 66. And based on the calculated central angle θw, the CPU 10 determines a position Pw of the waist on the trajectory WP (the elliptic trajectory whose minor axis has the length of zero) (refer to FIG. 6) and stores in the main memory the position Pw of the waist on the trajectory WP as the waist position data 70. After the process at step S23, the CPU 10 finishes the process of setting the trajectory and the position of the waist, shown in FIG. 11.

Figure 12:
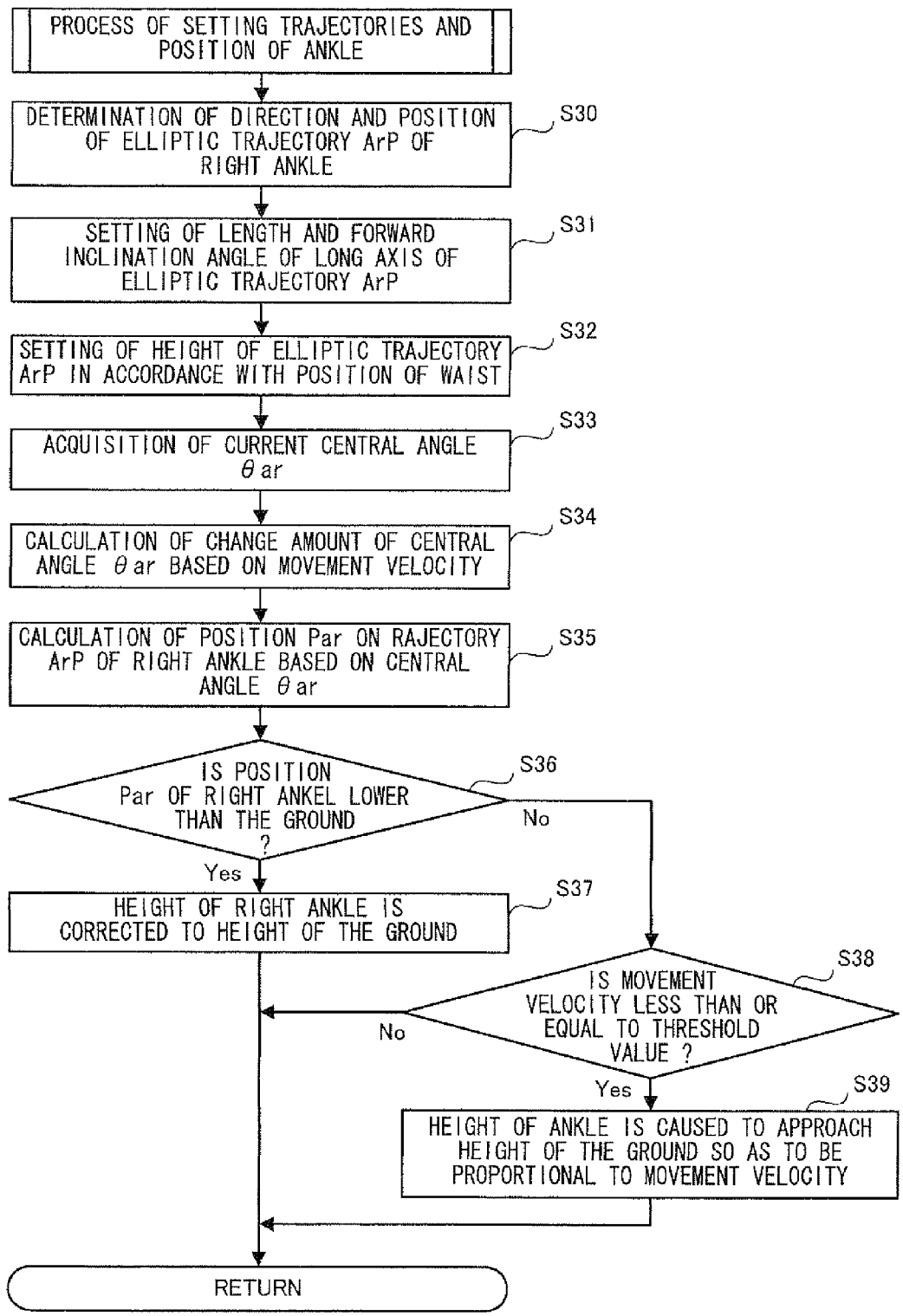
FIG. 12 is a flow chart showing details of a process (step S6) of setting a trajectory and a position of a right ankle, shown in FIG. 10.

Next, with reference back to FIG. 10, the CPU 10 executes a process at step S6. At step S6, the CPU 10 sets trajectories and positions of the ankles. The process executed here is the above-described process in which the positions of the elliptic trajectories (the trajectory ArP and the trajectory AlP) of the ankles (the right ankle Ar and the left ankle Al) in the game space and the positions of the ankles (the position Par of the right ankle and the position Pal of the left ankle) on the elliptic trajectories are set. Details of the process at step S6 will be described with reference to FIG. 12. FIG. 12 is a flow chart showing the details of the process (step S6) of setting the trajectory and the position of the right ankle, shown in FIG. 10. Note that although with reference to FIG. 12, setting of the trajectory and the position of the right ankle will be described, the trajectory and the position of the left ankle are similarly set.

First, the CPU 10 executes a process at step S30. At step S30, the CPU 10 sets a direction of the elliptic trajectory ArP and a position of the elliptic trajectory ArP in the game space. Specifically, the CPU 10 causes the direction of the elliptic trajectory ArP to coincide with the direction of the body of the player character, which has been determined at step S3. Here, the direction of the elliptic trajectory ArP is a direction from the center Oar of the elliptic trajectory ArP toward an intersection point of the long axis of the ellipse and the elliptic trajectory ArP (an intersection point in a case of the central angle θar=π/2, of a couple of intersection points of the long axis of the ellipse and the elliptic trajectory ArP). In addition, as similarly to at step S20, the CPU 10 sets the position of the elliptic trajectory ArP (position of the center Oar in the game space) based on the position and the movement velocity of the player character. Specifically, by moving the position of the elliptic trajectory ArP, which has been set last time at step S30, in a movement amount in accordance with a movement velocity, the CPU 10 sets the position of the center Oar of the elliptic trajectory ArP and stores in the main memory the position of the center Oar of the elliptic trajectory ArP as the ankle trajectory data 69. Next, the CPU 10 executes a process at step S31.

At step S31, the CPU 10 sets a length of the long axis (a length of a major axis) of the elliptic trajectory ArP and a forward inclination angle. Specifically, the CPU 10 first normalizes a vector of the relative velocity (a velocity component of the direction of the body of the velocity of the player character) calculated at step S4. When a value (namely, a value representing a ratio of the speed of "the direction of the body" to a magnitude of the movement velocity) of the relative velocity is, for example, greater than or equal to 0.5, the CPU 10 determines that the movement direction of the player character is a "forward direction" with respect to the direction of the body. In addition, when the value of the normalized relative velocity is, for example, less than or equal to −0.5, the CPU 10 determines that the movement direction of the player character is a "backward direction" with respect to the direction of the body. On the other hand, when the value of the relative velocity is not in the above-mentioned range (that is, in a case of "−0.5<the value of the relative velocity<0.5"), the CPU 10 determines that the movement direction of the player character is a "right and left direction" with respect to the direction of the body. And when the movement direction of the player character is the "forward direction" or the "backward direction", the CPU 10 sets a length of the long axis (a length of the major axis) of the elliptic trajectory ArP within a range of 2.0 to 2.5 in accordance with the movement velocity of the player character and stores in the main memory the length thereof as the ankle trajectory data 69. On the other hand, when the movement direction of the player character is the "right and left direction", the CPU 10 sets the longitudinal diameter of the elliptic trajectory ArP within a range of 1.2 to 1.8 in accordance with the movement velocity of the player character and stores in the main memory the length of the major axis as the ankle trajectory data 69. As described above, the range of the length of the long axis of the trajectory ArP is set in accordance with the velocity of the direction of the body (relative velocity) and further, the length of the long axis thereof is set in accordance with the movement velocity of the player character, thereby allowing a length of stride of the player character to be set in accordance with the velocity. In other words, when the velocity of the direction of the body is large, the length of stride can be set to be large and when the velocity of the direction of the body is small, the length of stride can be set to be small, thereby enabling a natural motion of the player character to be realized.

In addition, the CPU 10 sets the forward inclination angle (an angle formed by the long axis and the ground) of the long axis of the elliptic trajectory ArP. For example, when the movement direction of the player character is the forward direction, the CPU 10 sets the above-mentioned forward inclination angle in a range of 5 to 20 degrees in accordance with the movement velocity of the player character. In addition, when the movement direction of the player character is the backward direction, the CPU 10 sets the above-mentioned forward inclination angle to be −10 degrees, and when the movement direction of the player character is the right and left direction, the CPU 10 sets the above-mentioned forward inclination angle to be zero degree. And the CPU 10 stores in the main memory the set forward inclination angle as the ankle trajectory data 69. As described above, the forward inclination angle is set in accordance with the movement direction of the player character, thereby allowing the trajectory of the ankle to be set in accordance with the movement direction of the player character. In other words, for example, when the movement direction of the player character is the forward direction, the elliptic trajectory ArP is set such that a side of a traveling direction thereof descends by the forward inclination angle, thereby enabling motions of the ankles of the player character to be more naturally represented. Next, the CPU 10 executes a process at step S32.

At step S32, the CPU 10 sets a height of the elliptic trajectory ArP in accordance with a position of the waist. Specifically, based on a position Pw of the waist, which has been determined at step S23, the CPU 10 calculates a length from a topmost point to a position Pw on the trajectory WP of the waist and moves a position of the elliptic trajectory ArP by the calculated length in a downward direction in the game space (the ankle trajectory data 69 is updated). Next, the CPU 10 executes a process at step S33.

At step S33, the CPU 10 acquires a current central angle Oar of the right ankle. Specifically, referring to the main memory, the CPU 10 acquires the central angle ear which has been calculated last time at step S35 (described later). Next, the CPU 10 executes a process at step S34.

At step S34, the CPU 10 calculates a change amount of the central angle θar of the right ankle based on a movement velocity of the player character. The process at step S34 is the same as the above-described process at step S22. Specifically, the CPU 10 calculates the change amount of the central angle Oar in accordance with the movement amount obtained by multiplying the movement velocity of the player character, which has been determined at step S3, by the unit time (time period of one frame). Here, because an angular velocity of the central angle θar of the right ankle is set to be ½ of an angular velocity of the central angle θw of the waist, the change amount of the central angle Oar of the right ankle is a half of the change amount of the central angle θw of the waist, which has been calculated at step S22.

Note that herein, it is assumed that also when a movement direction of the player character is opposite to a direction of the body of the player that is, when the above-mentioned value of the vector of the relative velocity is negative), the change amount of the central angle θar is a positive value, not a negative value. In other words, when the player character is moving ahead and without changing the direction of the body, moves backward, the player character is moved in a constant direction on the trajectory without reversing the motions of the ankles. In this case, the change amount of the central angle Oar is corrected in accordance with a change in the relative velocity. Specifically, when the movement direction of the player character abruptly changes, the change amount of the central angle θar is increased in accordance with a degree of the change. Note that when the player character is moving ahead and without changing the direction of the body, moves backward, the motions of the ankles may be reversed.

Next, the CPU 10 executes a process at step S35.

At step S35, the CPU 10 calculates a position of the right ankle on the trajectory ArP based on the central angle Oar of the right ankle. Specifically, by adding the change amount of the central angle θar, which has been calculated at step S34, to the current central angle θar of the right ankle, which has been acquired at step S33, the CPU 10 calculates a new central angle θar of the right ankle and stores in the main memory the new central angle θar of the right ankle as the ankle angle data 67. And based on the calculated central angle θar, the CPU 10 calculates a position Par of the right ankle on the trajectory ArP (refer to FIG. 7) and stores in the main memory the position Par of the right ankle as the ankle position data 71. Next, the CPU 10 executes a process at step S36.

At step S36, the CPU 10 determines whether or not the position Par of the right ankle is lower than the ground. The process executed here is to determine whether or not the right ankle (all or a part thereof) is located lower than a terrain object when the right ankle is drawn based on the position Par of the right ankle. Specifically, the CPU 10 compares the height of the position Par of the right ankle in the game space, which has been calculated at step S35, and a height of the terrain object in the game space. When a determination result is positive, the CPU 10 next executes a process at step S37. On the other hand, when the determination result is negative, the CPU 10 next executes a process at step S38.

At step S37, the CPU 10 corrects the height of the right ankle to a height of the ground. Specifically, referring to the main memory, the CPU 10 acquires the height of the terrain object and sets the acquired height as the height of the right ankle, thereby updating the position Par of the right ankle, which has been calculated at step S35 (updating the ankle position data 71). After the process at step S37, the CPU 10 finishes the process of setting the trajectory and the position of the ankle, shown in FIG. 12.

On the other hand, at step S38, the CPU 10 determines whether or not the movement velocity of the player character is less than or equal to a predetermined threshold value. Specifically, the CPU 10 determines whether or not a magnitude of the movement velocity, which has been determined at step S3, is less than or equal to the predetermined threshold value. When a determination result is positive, in order to correct the position Par of the right ankle, the CPU 10 next executes a process at step S39. On the other hand, when the determination result is negative, the CPU 10 finishes the process of setting the trajectory and the position of the right ankle, shown in FIG. 12.

At step S39, the CPU 10 executes a process in which the height of the right ankle is caused to approach that of the ground so as to be proportional to the magnitude of the movement velocity of the player character. For example, when the magnitude of the movement velocity is equal to the predetermined threshold value at step S38, the CPU 10 does not correct the height of the right ankle, and when the magnitude of the movement velocity is zero, the CPU sets the height of the right ankle to the height of the terrain object. When the magnitude of the movement velocity is between the above-mentioned threshold value and zero, the CPU 10 sets the height of the right ankle so as to approach the ground proportionately with the magnitude of the movement velocity. In other words, the CPU 10 sets the height of the right ankle such that the smaller the movement velocity is, the more the right ankle approaches the ground. After the process at step S39, the CPU 10 finishes the process of setting the trajectory and the position of the ankle, shown in FIG. 12.

Figure 15:
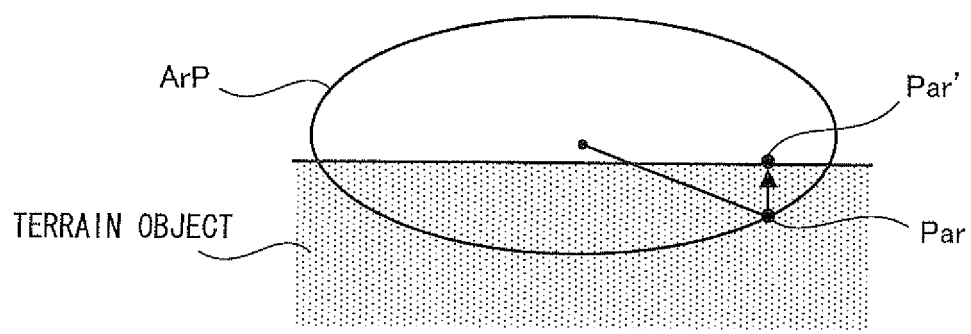
FIG. 15 is a diagram illustrating a process of setting a height of the ankle to be a height of the ground at step S37.
Figure 16:
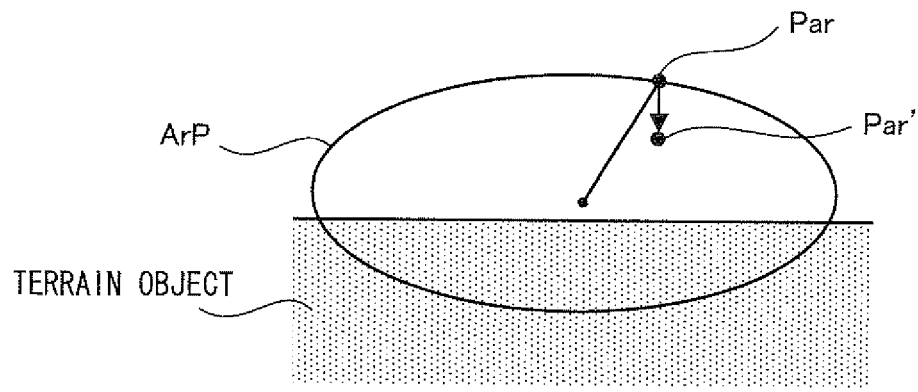
FIG. 16 is a diagram illustrating a process of setting the height of the ankle to be the height of the ground at step S39.

As described above, at step S37 or step S39, the height of the ankle is corrected, thereby allowing an unnatural display and motion of the player character to be prevented. Specifically, an unnatural state in which even when the legs and feet are not moving so much, the legs and feet are present in the air can be improved, and when the legs and feet are not moving, the legs and feet can be caused to approach the ground. FIG. 15 is a diagram illustrating a process of setting the height of the ankle to be the height of the ground at step S37. FIG. 16 is a diagram illustrating a process of setting the height of the ankle to be the height of the ground at step S39. As shown in FIG. 15, by causing the position Par of the right ankle to be located lower than the terrain object, the height of the right ankle is set to be the height of the terrain object when the right ankle is present inside the terrain object. Thus, the position of the right ankle is changed to be the corrected position Par' and the right ankle comes not to be present inside the terrain object, thereby allowing the ankle to be naturally displayed.

In addition, as shown in FIG. 16, when the right ankle is located above the terrain object and the magnitude of the movement velocity of the player character is smaller than the predetermined threshold value, the position of the right ankle is corrected to be a position Par' which is lower than a point Par on the trajectory ArP. For example, since it is unnatural that when the player character is not moving, the right ankle is present at a position above the ground, the height of the right ankle is corrected. On the other hand, since it is not unnatural when the movement velocity of the player character is faster than the velocity of the predetermined threshold value, the right ankle is present at a position above the ground, the height of the right ankle is not corrected. Accordingly, in accordance with the movement velocity of the player character, the height of the ankle in the game space is corrected, thereby allowing a natural motion of the player character to be realized.

Figure 13:
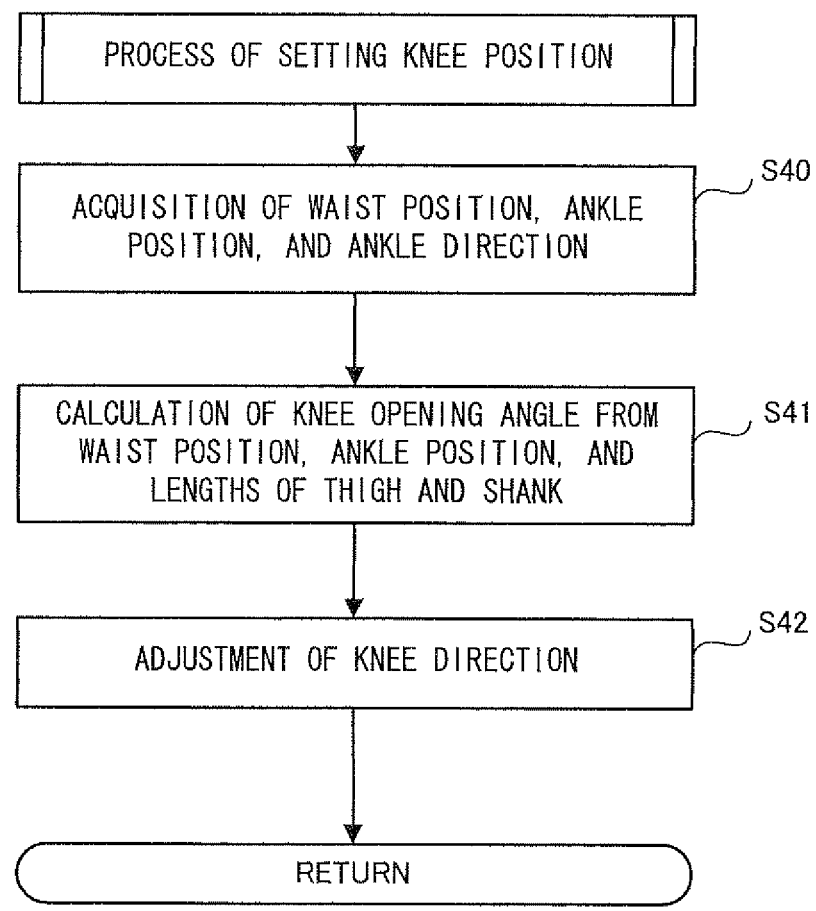
FIG. 13 is a flow chart showing details of a process (step S7) of setting positions of knees, shown in FIG. 10.

With reference back to FIG. 10, the CPU 10 next executes a process at step S7. At step S7, the CPU 10 executes a process of setting positions of knees. Details of the process at step S7 will be described with reference to FIG. 13. FIG. 13 is a flow chart showing the details of the process (step S7) of setting the positions of the knees, shown in FIG. 10.

First, the CPU 10 executes a process at step S40. At step S40, referring to the main memory, the CPU 10 acquires the position of the waist (set at step S5), the positions of the both ankles (set at step S6), and directions of the both ankles. Here, the directions of the both ankles are determined based on the direction of the body of the player character (set at step S3). For example, the direction of the body and the directions of the ankles may coincide with each other, and the direction of the body and the directions of the ankles may deviate from each other so as to form a predetermined angle between each other. Next, the CPU 10 executes a process at step S41.

At step S41, the CPU 10 calculates an opening angle of each of the knees (an angle formed by a thigh and a shank). Specifically, based on the position of the waist and the positions of the both ankles, which have been acquired at step S40, and lengths of the thigh and the shank, the CPU 10 calculates the opening angle of each of the knees. Here, the lengths of the thigh and the shank have been previously determined and stored in the main memory. Next, the CPU 10 executes a process at step S42.

At step S42, the CPU 10 adjusts directions of the knees. Specifically, in accordance with the direction of the body of the player character and the directions of the both ankles, the CPU 10 calculates the directions of the both knees (a degree of opening with respect to the direction of the body). After the process at step S42, the CPU 10 finishes the process of setting the positions of the knees, shown in FIG. 13.

Figure 14:
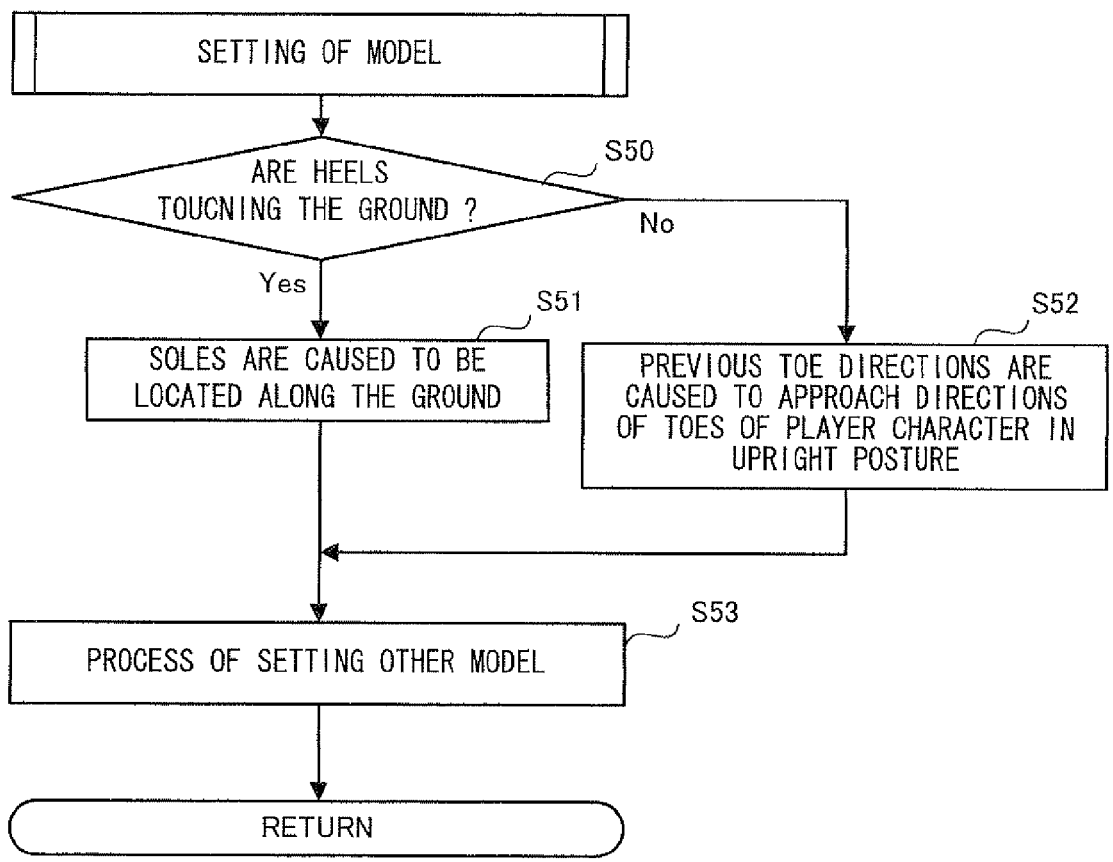
FIG. 14 is a flow chart showing details of a process (step S8) of setting a model, shown in FIG. 10.

With reference back to FIG. 10, the CPU 10 next executes a process at step S8. At step S8, the CPU 10 executes a process of setting a model. The process executed here is to set details of body parts (the waist, the ankles, heels, toes, etc.) to be drawn based on the positions and the directions of the body parts (the waists and the ankles). The details of the process at step S8 will be described with reference to FIG. 14. FIG. 14 is a flow chart showing the details of the process (step S8) of setting the model, shown in FIG. 10. Note that with reference to FIG. 14, only the process of setting the model with respect to the toes will be mainly described.

First, the CPU 10 executes a process at step S50. At step S50, the CPU 10 determines whether or not the heels are touching the ground. Specifically, based on the heights of the both ankles, which have been set at step S6, and the height of the ground, the CPU 10 determines whether or not the heels are touching the ground. For example, when a difference between each of the heights of the ankles and the height of the ground is smaller than a predetermined threshold value, the CPU 10 determines that the heels are touching the ground. When a determination result is positive, the CPU 10 next executes a process at step S51. On the other hand, when the determination result is negative, the CPU 10 next executes a process at step S52.

At step S51, the CPU 10 executes a process of causing soles to be located along the ground. The process executed here is to cause the toes and the like other than the heels to be touching the ground when it has been determined that the heels are touching the ground. As described above, when the heels are touching the ground, the soles are caused to be located along the ground, thereby allowing a motion and display of the legs and feet to be natural. After the process at step S51, the CPU 10 next executes a process at step S53.

At step S52, the CPU 10 executes the process of causing the previous directions of the toes to approach directions of toes in a state in which the player character is in an upright posture. The process executed here is to adjust up-and-down directions of the toes (an angle with respect to the ground) when the heels are not touching the ground. Specifically, referring to the main memory, the CPU 10 acquires the directions of the toes, which have been set last time at step S52, and causes each of the directions of the toes to approach, by a predetermined value, each of the directions of the toes in the state in which the player character is in the upright posture. For example, each of the directions of the toes in the state in which the player character is in the upright posture is set to be in parallel with the ground. As described above, each of the directions of the toes is adjusted, thereby preventing the directions of the toes from unnaturally turning up when the heels are not touching the ground. Next, the CPU 10 executes a process at step S53.

At step S53, the CPU 10 executes the process of setting other body parts of the model (hands, body, neck, etc.). Here, for example, a position of a hand is set in accordance of a position of the leg or a direction of a neck (face) is set. In addition, although the processes at the above-mentioned step S6 and step S7 are described only as to the right leg, the similar processes are executed also as to the left leg. However, an initial phase of the central angle of the right leg is displaced by $\pi$ from that of the left leg, that is, a motion in which the feet alternately lift up is performed. After the process at step S53, the CPU 10 finishes the process of setting the model, shown FIG. 14.

With reference back to FIG. 10, the CPU 10 next executes a process at step S9. At step S9, the CPU 10 executes other game processing. As the other game processing, based on a current position and a movement velocity of the player character, the CPU 10 sets a position of the player character itself, where the player character is located after having moved; causes objects (other characters of the player's team, characters of the opposing team, a ball, etc.) other than the player character to perform motions; or sets display areas thereof.

Next, at step S10, the CPU 10 executes a process of rendering. By using the positions of the waist and each of the ankles, which have been calculated as described above; the setting of the model, which has been conducted at the process of setting the model; the setting of the knees, which has been conducted at the process of setting the position of each of the knees; and the image data of the character (image data 72) in the basic posture, the process of rendering the player character is executed. In addition, the CPU 10 executes a process of rendering the other objects. By using the GPU 11$b$, the CPU 10 executes the process of rendering and as a result, a game image is displayed on the display device. Next, at step S11, the CPU 10 determines whether or not the game is finished. For example, when an instruction to finish the game is received from the player or when the game is cleared, the game processing is finished. When a determination result is positive, the CPU 10 finishes the game processing shown in FIG. 10. When the determination result is negative, the CPU 10 executes again the process at step S2.

As described above, in the present embodiment, the motions of the legs and feet of the game character are obtained through the calculation, thereby enabling the rendering. Thus, without necessity of previously preparing various motion images, various motions of the legs and feet of the character can be represented.

In the present embodiment, the case in which the motions of the legs and feet and the waist of the game character are displayed is described. However, in other embodiment, the above-described trajectories may be set with respect to other body parts of the character, such as a hand and a head, and by causing the other body parts to perform motions, the body parts may be displayed. In addition, in other embodiment, by employing the above-described method, not only the motions of the person but also motions of an animal (quadruped) may be realized.

In addition, in other embodiment, a part which is not a part of the body of the character may be deemed as a body part of the character, the above-described trajectories may be set with respect to such a part, and such a part may be caused to perform a motion. In other words, the above-described trajectories may be set with respect to one object which performs a motion in association with a motion of another object and the one object may be caused to perform a motion. For example, by setting a trajectory with respect to an item (weapon, etc.) carried by the character, on which the item moves, based on a position of the character, the item may be caused to perform a motion.

In addition, in the present embodiment, the trajectory on which the waist moves is the line segment (the ellipse whose minor axis has the length of zero) and the trajectory on which each of the ankles moves is the elliptic trajectory. However, in other embodiment, the trajectory of the waist may be an elliptic trajectory and the trajectory of each of the ankles may be a line segment. In addition, other embodiment, the trajectory on which each of the body parts moves may be of any shape and for example, may be of a circle or a polygon such as a quadrangle and a triangle.

In addition, in the present embodiment, the period of each of the ankles (the time which the right ankle needs to shuttle on the elliptic trajectory ArP) is set to be double the period of the waist (the time which the waist needs to shuttle on the trajectory WP) and the phases of the both ankles are displaced by $\pi$ from each other. However, in other embodiment, any difference between the phases of the body parts and any periods thereof may be determined. For example, the period of each of the ankles may be set so as to be independent of the period of the waist. In addition, for example, by setting a difference between the phases of the both ankles to be zero, a motion or the like in which jumping with the both legs can be realized.

In addition, in the present embodiment, based on the central angle of each of the trajectories of the body parts, the position on each of the trajectories is determined. However, in other embodiment, the position on each of the trajectories may be determined in any manner. For example, each of the body parts may be caused to move on each of the set trajectories at a velocity in accordance with the movement velocity of the character.

In addition, the above-mentioned angular velocity of the central angle is not necessarily required to be associated with the movement velocity of the character, and even when the character is in a static state, the above-mentioned central angle may be changed. For example, a view in which the character performs an up-and-down motion (a motion in which the body thereof sways up and down) at a predetermined position in the game space while moving nowhere may be realized. In other words, when the movement velocity of the character is zero, by moving the position of the waist on the above-mentioned trajectory WP, the view in which the character performs the up-and-down motion and a view in which the character performs a bending and stretching motion can be realized.

In addition, in the present embodiment, the game of the basketball is described. However, the above-described method may be utilized for a variety of games. For example, a view in which people walk and run in a baseball game or other sport game can be realized by employing the above-described method.

Further, the game program according to one embodiment of the present invention may be provided for the game apparatus 3 not only in a form of an external storage medium such as the optical disc 4 but also via a wired or wireless communication line. Further, the game program may be previously stored in a nonvolatile storage device mounted in the game apparatus 3. As an information storage medium (computer-readable storage medium) having a game program stored thereon, a nonvolatile semiconductor memory as well as a CD-ROM, a DVD, and any other optical disc-shaped storage medium may be used.

Further, in the present embodiment, the CPU 10 of the game apparatus 3 executes the game program, whereby the processes in the above-described flow chart are executed. In other embodiment, some or all of the above-described processes may be performed by a dedicated circuit provided in the game apparatus 3.

While the invention has been described in detail, the foregoing description is in all aspects illustrative and not restrictive. It is understood that numerous other modifications and variations can be devised without departing from the scope of the invention.

What is claimed is:

1. An apparatus, having an associated input device and a display device and including one or more information processing units, operable to generate and display movements of, a virtual object in a virtual space, comprising:
   at least one computer processor configured to provide functionality and operate as:
   virtual object position controller that sets, using said one or more information processing units, a position of the virtual object in the virtual space and changes the set position of the virtual object based at least in part upon an input signal provided by the input device;
   a first body part position controller that sets and updates position data of a first body part of the virtual object, using said one or more information processing units, as a relative position in the virtual space with respect to the position of the virtual object; and
   a display controller that displays on a screen of the display device an animated image of the virtual object including the first body part,
   wherein the set position data of the first body part is repeatedly updated by calculating an updated position of the first body part in virtual space, using said one or more information processing units, in a manner which causes the first body part to move a predetermined amount along a first trajectory in accordance with a movement amount of the virtual object in the virtual space, and wherein the first trajectory is a circle or an ellipse whose minor axis has a length greater than or equal to zero which is set in accordance with the position of the virtual object.

2. The apparatus according to claim 1, wherein the first body part position controller sets the position of the first body part on said circle or ellipse.

3. The apparatus according to claim 1, wherein the first body part position controller sets a central angle of the ellipse or circle in accordance with the movement amount of the virtual object and sets a point on the ellipse or circle as the position of the first body part, the point determined based on the central angle.

4. The apparatus according to claim 3, wherein the first body part position controller includes center position setter that sets a position of a center of the ellipse or circle based on the position of the virtual object.

5. The apparatus according to claim 1, further comprising second body part position controller that sets a position of a second body part of the virtual object as a relative position with respect to the position of the virtual object, which is set by the virtual object position controller, wherein
the second body part position controller sets the position of the second body part by moving the second body part in an amount in accordance with the movement amount of the virtual object, the second body part being moved on a second trajectory set in accordance with the position of the virtual object,
the first body part position controller sets the position of the first body part as a relative position with respect to the position of the second body part, and
the display controller displays on the screen an image including the first body part and the second body part.

6. The apparatus according to claim 5, wherein
the second trajectory is of an ellipse whose minor axis has a length of greater than or equal to zero or of a circle, and
the second body part position controller sets a central angle of the ellipse or circle in accordance with the movement amount of the virtual object and sets a point on the ellipse or circle as the position of the second body part, the point determined based on the central angle.

7. The apparatus according to claim 1, further comprising second body part position controller that sets a position of a second body part of the virtual object as a relative position with respect to the position of the virtual object, which is set by the virtual object position controller, wherein
the second body part position controller sets the position of the second body part by moving the second body part in an amount in accordance with the movement amount of the virtual object, the second body part being moved on a second trajectory set in accordance with the position of the virtual object,
the display controller displays on the screen an image including the first body part and the second body part, and
when the virtual object is moving in the virtual space, the first body part rotates around or shuttles along the first trajectory and the second body part rotates around or shuttles along the second trajectory, and a period in which the first body part rotates around or shuttles along the first trajectory is double a period in which the second body part rotates around or shuttles along the second trajectory.

8. The apparatus according to claim 7, further comprising third body part position controller a position of a third body part of the virtual object as a relative position with respect to the position of the virtual object, which is set by the virtual object position controller, wherein
the third body part position controller sets the position of the third body part by moving the third body part in an amount in accordance with the movement amount of the virtual object, the third body part being moved on a third trajectory set in accordance with the position of the virtual object and the position of the third body part being set as a relative position with respect to the position of the second body part,
the display controller displays on the screen an image including the first body part, the second body part, and the third body part, and
when the virtual object is moving in the virtual space, the third body part moves on the third trajectory in a periodic fashion having a same period of movement along the third trajectory as that of the first body part along the first trajectory, and there is a predetermined difference between a movement phase of the first body part and a movement phase of the third body part.

9. The apparatus according to claim 8, wherein the virtual object is a virtual person object, the first body part and the third body part are ankles, and the second body part is a waist.

10. The apparatus according to claim 9, further comprising a knee state setter that sets a knee state based on the position of the ankle, which is set by the first body part position controller, and on the position of the waist, which is set by the second body part position controller.

11. The apparatus according to claim 1, wherein
the virtual object moves on a predetermined virtual terrain object present in the virtual space, and the first body part position controller includes:
first body part position determiner that determines whether the first body part is present inside the virtual terrain object; and
first body part position corrector that corrects the position of the first body part to be on a surface of the virtual terrain object, when the first body part position determiner determines that the first body part is present inside the virtual terrain object.

12. The apparatus according to claim 1, wherein
the virtual object moves on a predetermined virtual terrain object present in the virtual space, and
when the movement amount of the virtual object per unit time is smaller than a predetermined threshold value, the first body part position controller further sets the position of the first body part such that the position of the first body part is caused to approach the virtual terrain object.

13. The apparatus according to claim 1, wherein the virtual object position controller sets the position of the virtual object in the virtual space based on a predetermined operation input.

14. An apparatus, having an associated input device and a display device and including one or more information processing units, operable to generate and display movements of a virtual object in a virtual space, comprising:
a computer processor configured to provide functionality and operates as:
a virtual object position controller configured, using said one or more information processing units, to set a position of the virtual object in the virtual space and change the set position of the virtual object based at least in part upon an input signal provided by the input device;
a first body part motion controller that sets and updates position data of a first body part of the virtual object in a manner that causes the first body part of the virtual object, using said one or more information processing units, to move in a relative motion with respect to the position of the virtual object, in the virtual space; and
a display controller configured to display on a screen of the display device an animated image of the virtual object including first body part motion caused by the first body part motion controller, wherein the first body part motion controller causes the first body part to more in the relative motion by repeatedly calculating and updating set position data of the first body part in a manner which causes the first body part to move within a predetermined time period along a first trajectory in accordance with a movement amount of the virtual object, and wherein the first trajectory is a circle or an ellipse whose minor axis has a length greater than or equal to zero and which is moved in the virtual space in accordance with movement of the virtual object.

15. A computer-readable non-transitory storage medium having stored thereon a game program executed by a computer in a game apparatus having an associated input device and a display device, the game apparatus operable to move a virtual object in a virtual space and display the motion on a display device, the program comprising instructions causing the computer to function or perform as:

virtual object position controller that sets a position of the virtual object in the virtual space and changes the set position of the virtual object based at least in part upon an input signal provided by the input device; and first body part position controller that sets and updates position data of a first body part of the virtual object as a relative position in the virtual space with respect to the position of the virtual object, wherein the computer is further caused to function as a display controller that displays on a screen of the display device an animated image of the virtual object including the first body part, and wherein the set position data of the first body part is repeatedly updated by calculating an updated position of the first body part in virtual space in a manner which causes the first body part to move a predetermined amount along a first trajectory in accordance with a movement amount of the virtual object, and wherein the first trajectory is a circle or an ellipse whose minor axis has a length greater than or equal to zero which is set in accordance with the position of the virtual object.

16. The computer-readable non-transitory storage medium having stored thereon the game program according to claim 15, wherein the first body part position controller sets the position of the first body part on said circle or ellipse.

17. The computer-readable non-transitory storage medium having stored thereon the game program according to claim 15, wherein the first body part position controller sets a central angle of the ellipse or circle in accordance with the movement amount of the virtual object and sets a point on the ellipse or circle as the position of the first body part, the point determined based on the central angle.

18. The computer-readable non-transitory storage medium having stored thereon the game program according to claim 17, wherein the first body part position controller includes center position setter that sets a position of a center of the ellipse or circle based on the position of the virtual object.

19. The computer-readable non-transitory storage medium having stored thereon the game program according to claim 15, wherein the computer is caused to further function as second body part position controller that sets a position of a second body part of the virtual object as a relative position with respect to the position of the virtual object, which is set by the virtual object position controller, the second body part position controller sets the position of the second body part by moving the second body part in an amount in accordance with the movement amount of the virtual object, the second body part being moved on a second trajectory set in accordance with the position of the virtual object, the first body part position controller sets the position of the first body part as a relative position with respect to the position of the second body part, and the display controller displays on the screen an image including the first body part and the second body part.

20. The computer-readable non-transitory storage medium having stored thereon the game program according to claim 19, wherein the second trajectory is of an ellipse whose minor axis has a length of greater than or equal to zero or of a circle, and the second body part position controller sets a central angle of the ellipse or circle in accordance with the movement amount of the virtual object and sets a point on the ellipse or circle as the position of the second body part, the point determined based on the central angle.

21. The computer-readable non-transitory storage medium having stored thereon the game program according to claim 15, wherein the computer is caused to further function as second body part position controller that sets a position of a second body part of the virtual object as a relative position with respect to the position of the virtual object, which is set by the virtual object position controller, the second body part position controller sets the position of the second body part by moving the second body part in an amount in accordance with the movement amount of the virtual object, the second body part being moved on a second trajectory set in accordance with the position of the virtual object, the display controller displays on the screen an image including the first body part and the second body part, and when the virtual object is moving in the virtual space, the first body part rotates around or shuttles along the first trajectory and the second body part rotates around or shuttles along the second trajectory, and a period in which the first body part rotates around or shuttles along the first trajectory is double a period in which the second body part rotates around or shuttles along the second trajectory.

22. The computer-readable non-transitory storage medium having stored thereon the game program according to claim 21, wherein the computer is caused to further function as third body part position controller that sets a position of a third body part of the virtual object as a relative position with respect to the position of the virtual object, which is set by the virtual object position controller, the third body part controller sets the position of the third body part by moving the third body part in an amount in accordance with the movement amount of the virtual object, the third body part being moved on a third trajectory set in accordance with the position of the virtual object and the position of the third body part being set as a relative position with respect to the position of the second body part, the display controller displays on the screen an image including the first body part, the second body part, and the third body part, and when the virtual object is moving in the virtual space, the third body part moves on the third trajectory in a periodic fashion having a same period of movement along the third trajectory as that of the first body part along the first trajectory, and there is a predetermined difference between a movement phase of the first body part and a movement phase of the third body part.

23. The computer-readable non-transitory storage medium having stored thereon the game program according to claim 22, wherein the virtual object is a virtual person object, the first body part and the third body part are ankles, and the second body part is a waist.

24. The computer-readable non-transitory storage medium having stored thereon the game program according to claim 23, wherein the computer is caused to further function as knee state setter that sets a knee state based on the position of the ankle, which is set by the first body part position controller, and on the position of the waist, which is set by the second body part position controller.

25. The computer-readable non-transitory storage medium having stored thereon the game program according to claim 15, wherein
the virtual object moves on a predetermined virtual terrain object present in the virtual space, and
the first body part position controller includes:
first body part position detector that determines whether or not the first body part is present inside the virtual terrain object; and
first body part position corrector that corrects, when the position detector determines that the first body part is present inside the virtual terrain object, the position of the first body part to be on a surface of the virtual terrain object.

26. The computer-readable non-transitory storage medium having stored thereon the game program according to claim 15, wherein
the virtual object moves on a predetermined virtual terrain object present in the virtual space, and
when the movement amount of the virtual object per unit time is smaller than a predetermined threshold value, the first body part position controller further sets the position of the first body part such that the position of the first body part is caused to approach the virtual terrain object.

27. The computer-readable non-transitory storage medium having stored thereon the game program according to claim 15, wherein the virtual object position controller sets the position of the virtual object in the virtual space based on a predetermined operation input.

28. A computer-readable non-transitory storage medium having stored thereon a game program executable by a computer in a game apparatus having an associated input device and a display device, the game apparatus operable to cause a virtual object to perform a motion in a virtual space and display the motion on the display device, the program comprising instructions causing the computer to function as:
virtual object position controller that sets a position of the virtual object in the virtual space and changes the set position of the virtual object based at least in part upon an input signal provided by the input device;
first body part motion controller that sets and updates position data of a first body part of the virtual object in a manner that causes the first body part of the virtual object to move in a relative motion with respect to the position of the virtual object, in the virtual space; and
display controller that displays on a screen of the display device an animated image of the virtual object including first body part motion caused by the first body part motion controller, wherein the first body part motion controller causes the first body part to move in the relative motion by repeatedly calculating and updating set position data of the first body part in a manner which causes the first body part to move within a predetermined time period along a first trajectory in accordance with a movement amount of the virtual object, and wherein the first trajectory is a circle or an ellipse whose minor axis has a length greater than or equal to zero and which is moved in the virtual space in accordance with movement of the virtual object.

29. A game apparatus including an input device and a display device, comprising:
a processing system including at least one computer processor, the processing system being configured to:
create a virtual object in a virtual space, the virtual object having one or more associated body parts;
set a position of the virtual object in the virtual space;
set position data for an associated first body part in the virtual space at a relative position with respect to the set position of the virtual object;
change the set position of the virtual object in the virtual space based at least in part upon an input signal provided by the input device;
animate the first body part in the virtual space in accordance with a movement of the virtual object in the virtual space by repeatedly calculating and updating the set position data of the first body part in a manner which causes the first body part to move a predetermined amount along a first trajectory relative to the virtual object in accordance with a movement amount of the virtual object, where the first trajectory is a circle or an ellipse whose minor axis has a length greater than or equal to zero and which is moved in the virtual space in accordance with movement of the virtual object in the virtual space; and
display an animated image of the virtual object in the virtual space including movement of the first body part relative to the virtual object on the display device.

30. A game apparatus including an input device and a display device, comprising:
a processing system including at least one computer processor, the processing system being configured to:
create a virtual object in a virtual space, the virtual object having one or more associated body parts;
set a position of the virtual object in the virtual space;
set position data for an associated first body part in the virtual space at a relative position with respect to the set position of the virtual object;
change the set position of the virtual object in the virtual space based at least in part upon an input signal provided by the input device;
animate the first body part in the virtual space in accordance with movement of the virtual object in the virtual space by repeatedly calculating and updating the set position data of the first body part in a manner which causes the first body part to complete a movement along an entirety of a first trajectory relative to the virtual object within a predetermined time period, where the first trajectory is a circle or an ellipse whose minor axis has a length greater than or equal to zero and which is moved in the virtual space in accordance with movement of the virtual object in the virtual space; and
display an animated image of the virtual object in the virtual space including movement of the first body part relative to the virtual object on the display device.

* * * * *